US012718825B2

(12) United States Patent
Huang et al.

(10) Patent No.: US 12,718,825 B2
(45) Date of Patent: Aug. 25, 2026

(54) AUDIO PROCESSING METHOD AND APPARATUS BASED ON SPECTRAL FLATNESS INFORMATION AND SPECTRAL ENVELOPE INFORMATION, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Qingbo Huang, Shenzhen (CN); Yuyong Kang, Shenzhen (CN); Wei Xiao, Shenzhen (CN); Meng Wang, Shenzhen (CN); Yupeng Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 85 days.

(21) Appl. No.: 18/647,394

(22) Filed: Apr. 26, 2024

(65) Prior Publication Data

US 2024/0296854 A1 Sep. 5, 2024

Related U.S. Application Data

(63) Continuation of application No. PCT/CN2023/091157, filed on Apr. 27, 2023.

(30) Foreign Application Priority Data

Jun. 15, 2022 (CN) ......................... 202210681060.9

(51) Int. Cl.

*G10L 19/02* (2013.01)
*G10L 19/032* (2013.01)
*G10L 21/038* (2013.01)

(52) U.S. Cl.

CPC ........ *G10L 19/0204* (2013.01); *G10L 19/032* (2013.01); *G10L 21/038* (2013.01)

(58) Field of Classification Search

CPC . G10L 19/032; G10L 19/0204; G10L 21/038; G10L 25/30

See application file for complete search history.

(56) References Cited

U.S. PATENT DOCUMENTS 9,443,534 B2 * 9/2016 Gao ...................... G10L 19/022
9,818,419 B2 * 11/2017 Atti ...................... G10L 21/038

(Continued)

FOREIGN PATENT DOCUMENTS

CN 101093670 A 12/2007
CN 101317217 A 12/2008

(Continued)

OTHER PUBLICATIONS

Li, Kehuang, and Chin-Hui Lee. "A deep neural network approach to speech bandwidth expansion." 2015 IEEE international conference on acoustics, speech and signal processing (Icassp). IEEE, 2015.*

(Continued)

*Primary Examiner* — Shaun Roberts

(74) *Attorney, Agent, or Firm* — Anova Law Group, PLLC

(57) ABSTRACT

An audio processing method includes: filtering an audio signal to obtain a low-frequency signal and a high-frequency signal; encoding the low-frequency signal to obtain a bitstream of the low-frequency signal; performing frequency domain transform on the low-frequency signal and the high-frequency signal respectively, to obtain a low-frequency spectrum and a high-frequency spectrum; performing spectral envelope extraction on the low-frequency spectrum and the high-frequency spectrum to obtain spectral (Continued)

envelope information, and performing spectral flatness extraction on the high-frequency spectrum to obtain spectral flatness information; and performing quantization encoding on the spectral flatness information and the spectral envelope information to obtain a bandwidth extension bitstream, and combining the bandwidth extension bitstream and the bitstream of low-frequency signal into an encoded bitstream.

20 Claims, 8 Drawing Sheets

(56) References Cited

U.S. PATENT DOCUMENTS

| | | | | |
|---|---|---|---|---|
| 10,332,535 | B2 * | 6/2019 | Disch | G10L 19/18 |
| 11,621,009 | B2 * | 4/2023 | Villemoes | G10L 19/032 704/203 |
| 11,985,179 | B1 * | 5/2024 | Tacer | G10L 21/00 |
| 2002/0072899 | A1 * | 6/2002 | Paksoy | G10L 19/0208 704/219 |
| 2003/0187663 | A1 | 10/2003 | Truman et al. | |
| 2007/0219785 | A1 * | 9/2007 | Gao | G10L 19/26 704/200.1 |
| 2009/0030678 | A1 | 1/2009 | Kovesi et al. | |
| 2009/0144062 | A1 * | 6/2009 | Ramabadran | G10L 21/038 704/500 |
| 2010/0063810 | A1 * | 3/2010 | Gao | G10L 19/032 370/352 |
| 2010/0063812 | A1 * | 3/2010 | Gao | G10L 19/002 704/230 |
| 2010/0228541 | A1 | 9/2010 | Oshikiri | |
| 2012/0016667 | A1 | 1/2012 | Gao | |
| 2014/0074489 | A1 * | 3/2014 | Chong | G10L 19/04 704/500 |
| 2015/0066493 | A1 | 3/2015 | Bayer et al. | |
| 2016/0210977 | A1 * | 7/2016 | Ghido | G10L 19/038 |
| 2016/0255452 | A1 * | 9/2016 | Nowak | G10L 19/008 381/17 |
| 2017/0188175 | A1 * | 6/2017 | Oh | H04S 3/008 |
| 2017/0345443 | A1 | 11/2017 | Choo | |
| 2018/0277097 | A1 * | 9/2018 | Li | G10L 15/22 |
| 2019/0172472 | A1 | 6/2019 | Truman et al. | |
| 2019/0258917 | A1 * | 8/2019 | Chai | G06N 3/084 |
| 2020/0143817 | A1 | 5/2020 | Truman et al. | |
| 2021/0005209 | A1 * | 1/2021 | Beack | G06N 3/0455 |
| 2021/0166705 | A1 * | 6/2021 | Chang | G10L 25/30 |
| 2022/0068285 | A1 | 3/2022 | Xiao et al. | |
| 2023/0016637 | A1 * | 1/2023 | Schmidt | G06N 3/045 |

FOREIGN PATENT DOCUMENTS

| | | | |
|---|---|---|---|
| CN | 101390158 | A | 3/2009 |
| CN | 111210832 | A | 5/2020 |
| CN | 112530446 | A | 3/2021 |
| CN | 115148217 | A | 10/2022 |
| JP | 2000261321 | A | 9/2000 |
| JP | 2005521907 | A | 7/2005 |
| JP | 2009527785 | A | 7/2009 |
| JP | 2011527458 | A | 10/2011 |
| JP | 2016197271 | A | 11/2016 |
| JP | 2019528479 | A | 10/2019 |
| JP | 2022527810 | A | 6/2022 |
| KR | 1020040101227 | A | 12/2004 |
| KR | 1020080070831 | A | 7/2008 |
| KR | 1020080107428 | A | 12/2008 |
| WO | 2007063913 | A1 | 6/2007 |
| WO | 2009109139 | A1 | 9/2009 |
| WO | 2010048827 | A1 | 5/2010 |

OTHER PUBLICATIONS

J. Su, Y. Wang, A. Finkelstein and Z. Jin, "Bandwidth Extension is All You Need," ICASSP 2021-2021 IEEE International Conference on Acoustics, Speech and Signal Processing (ICASSP), Toronto, ON, Canada, 2021, pp. 696-700, doi: 10.1109/ICASSP39728.2021.9413575.*

Schmidt, Konstantin, and Bernd Edler. "Blind bandwidth extension based on convolutional and recurrent deep neural networks." 2018 IEEE International Conference on Acoustics, Speech and Signal Processing (ICASSP). IEEE, 2018.*

The European Patent Office (EPO) The Extended European Search Report for Application No. 23822811.8 Dec. 20, 2024 8 Pages.

Jie Zhan et al., "Bandwidth extension for China AVS-M standard." 2009 IEEE International Conference on Acoustics, Speech and Signal Processing. IEEE, 2009.

The Japan Patent Office (JPO) Notice of Reasons for Refusal for Application No. 2024-524602 Jun. 6, 2025 13 Pages (including translation).

The World Intellectual Property Organization (WIPO) International Search Report for PCT/CN2023/091157 Aug. 19, 2023 7 Pages (including translation).

AVS3P10 progress—Next-generationaudio codec standard, Tencent has laida good foundation! Conference news, Dec 20, 2023.

* cited by examiner

AUDIO PROCESSING METHOD AND APPARATUS BASED ON SPECTRAL FLATNESS INFORMATION AND SPECTRAL ENVELOPE INFORMATION, ELECTRONIC DEVICE, AND COMPUTER-READABLE STORAGE MEDIUM

CROSS-REFERENCES TO RELATED APPLICATIONS

This application is a continuation application of PCT Patent Application No. PCT/CN2023/091157, filed on Apr. 27, 2023, which claims priority to Chinese Patent Application No. 202210681060.9, filed on Jun. 15, 2022, both of which are incorporated herein by reference in their entirety.

FIELD OF THE TECHNOLOGY

The present disclosure relates to the field of audio processing technologies, and in particular, to an audio processing method and apparatus, an electronic device, and a computer-readable storage medium.

BACKGROUND OF THE DISCLOSURE

In an ultra wideband (UWB) audio encoding scenario, according to a human hearing mechanism and a psychoacoustic model, a user is usually more sensitive to a low-frequency part of a signal than to a high-frequency part of the signal. In codec processing, a higher bitrate is allocated to the low-frequency part of the signal than to the high-frequency part. However, this does not mean that the high-frequency part is discarded. Absence of the high-frequency part affects a subjective sense of hearing.

Therefore, a high-frequency signal needs to be encoded and decoded in the ultra-wideband audio encoding scenario. No effective implementation solution for efficiently encoding and decoding a high-frequency signal with a very low bitrate is available.

SUMMARY

Embodiments of the present disclosure provide an audio processing method and apparatus, an electronic device, a computer-readable storage medium, and a computer program product, to encode spectral flatness information during encoding to improve code integrity of a high-frequency part and improve quality of audio obtained through subsequent decoding.

Technical solutions in embodiments of the present disclosure are implemented as follows:

Embodiments of the present disclosure provide an audio processing method, the method being performed by an electronic device, and including: filtering an audio signal to obtain a low-frequency signal and a high-frequency signal; encoding the low-frequency signal to obtain a bitstream of the low-frequency signal; performing frequency domain transform on the low-frequency signal and the high-frequency signal respectively, to obtain a low-frequency spectrum and a high-frequency spectrum; performing spectral envelope extraction on the low-frequency spectrum and the high-frequency spectrum to obtain spectral envelope information of the audio signal, and performing spectral flatness extraction on the high-frequency spectrum to obtain spectral flatness information of the high-frequency spectrum; and performing quantization encoding on the spectral flatness information of the high-frequency spectrum and the spectral envelope information of the audio signal to obtain a bandwidth extension bitstream of the audio signal, and combining the bandwidth extension bitstream and the bitstream of the low-frequency signal into an encoded bitstream of the audio signal.

Embodiments of the present disclosure provide an audio processing apparatus, including: a band division module, configured to filter an audio signal to obtain a low-frequency signal and a high-frequency signal; an encoding module, configured to encode the low-frequency signal to obtain a bitstream of the low-frequency signal; a frequency domain transform module, configured to perform frequency domain transform on the low-frequency signal and the high-frequency signal respectively, to obtain a low-frequency spectrum and a high-frequency spectrum; an extraction module, configured to perform spectral envelope extraction on the low-frequency spectrum and the high-frequency spectrum to obtain spectral envelope information of the audio signal, and perform spectral flatness extraction on the high-frequency spectrum to obtain spectral flatness information of the high-frequency spectrum; and a quantization module, configured to perform quantization encoding on the spectral flatness information of the high-frequency spectrum and the spectral envelope information of the audio signal to obtain a bandwidth extension bitstream of the audio signal, and combine the bandwidth extension bitstream and the bitstream of the low-frequency signal into an encoded bitstream of the audio signal.

Embodiments of the present disclosure provide an audio processing method, the method being performed by an electronic device, and including: splitting an encoded bitstream to obtain a bandwidth extension bitstream and a bitstream of a low-frequency signal; decoding the bitstream of the low-frequency signal to obtain the low-frequency signal, and performing frequency domain transform on the low-frequency signal to obtain a low-frequency spectrum of the low-frequency signal; dequantizing the bandwidth extension bitstream to obtain spectral flatness information and spectral envelope information; performing high-frequency spectrum reconstruction based on the spectral flatness information, the spectral envelope information, and the low-frequency spectrum to obtain a high-frequency spectrum; and performing time domain transform on the high-frequency spectrum to obtain a high-frequency signal, and synthesizing the low-frequency signal and the high-frequency signal to obtain an audio signal corresponding to the encoded bitstream.

Embodiments of the present disclosure provide an audio processing apparatus, including: a splitting module, configured to split an encoded bitstream to obtain a bandwidth extension bitstream and a bitstream of a low-frequency signal; a core module, configured to decode the bitstream of the low-frequency signal to obtain the low-frequency signal, and perform frequency domain transform on the low-frequency signal to obtain a low-frequency spectrum of the low-frequency signal; a dequantization module, configured to dequantize the bandwidth extension bitstream to obtain spectral flatness information and spectral envelope information; a reconstruction module, configured to perform high-frequency spectrum reconstruction based on the spectral flatness information, the spectral envelope information, and the low-frequency spectrum to obtain a high-frequency spectrum; and a time domain transform module, configured to perform time domain transform on the high-frequency spectrum to obtain a high-frequency signal, and synthesize the low-frequency signal and the high-frequency signal to obtain an audio signal corresponding to the encoded bitstream.

Embodiments of the present disclosure provide an electronic device, including: a memory, configured to store computer-executable instructions; and a processor, configured to implement the audio processing method provided in embodiments of the present disclosure when executing the computer-executable instructions stored in the memory.

Embodiments of the present disclosure provide a non-transitory computer-readable storage medium, having computer-executable instructions stored therein for implementing the audio processing method provided in embodiments of the present disclosure when being executed by a processor.

Embodiments of the present disclosure have the following beneficial effect:

An audio signal is filtered to obtain a low-frequency signal with a low frequency and a high-frequency signal with a high frequency, and the low-frequency signal is encoded to obtain a bitstream of the low-frequency signal. Spectral envelope information of the audio signal and spectral flatness information of the high-frequency signal are extracted from a low-frequency spectrum of the low-frequency signal and a high-frequency spectrum of the high-frequency signal. Quantization encoding is performed on the spectral flatness information and the spectral envelope information to obtain a bandwidth extension bitstream of the audio signal, and the bandwidth extension bitstream of the audio signal is combined with the bitstream of the low-frequency signal into an encoded bitstream of the audio signal. The high-frequency signal can be effectively encoded based on the spectral envelope information and the spectral flatness information. The spectral flatness information helps restore high-frequency signal, and can supplement the spectral envelope information, so that code integrity of the high-frequency part can be finally improved, to improve quality of audio obtained through subsequent decoding.

DESCRIPTION OF EMBODIMENTS

Figure 1:
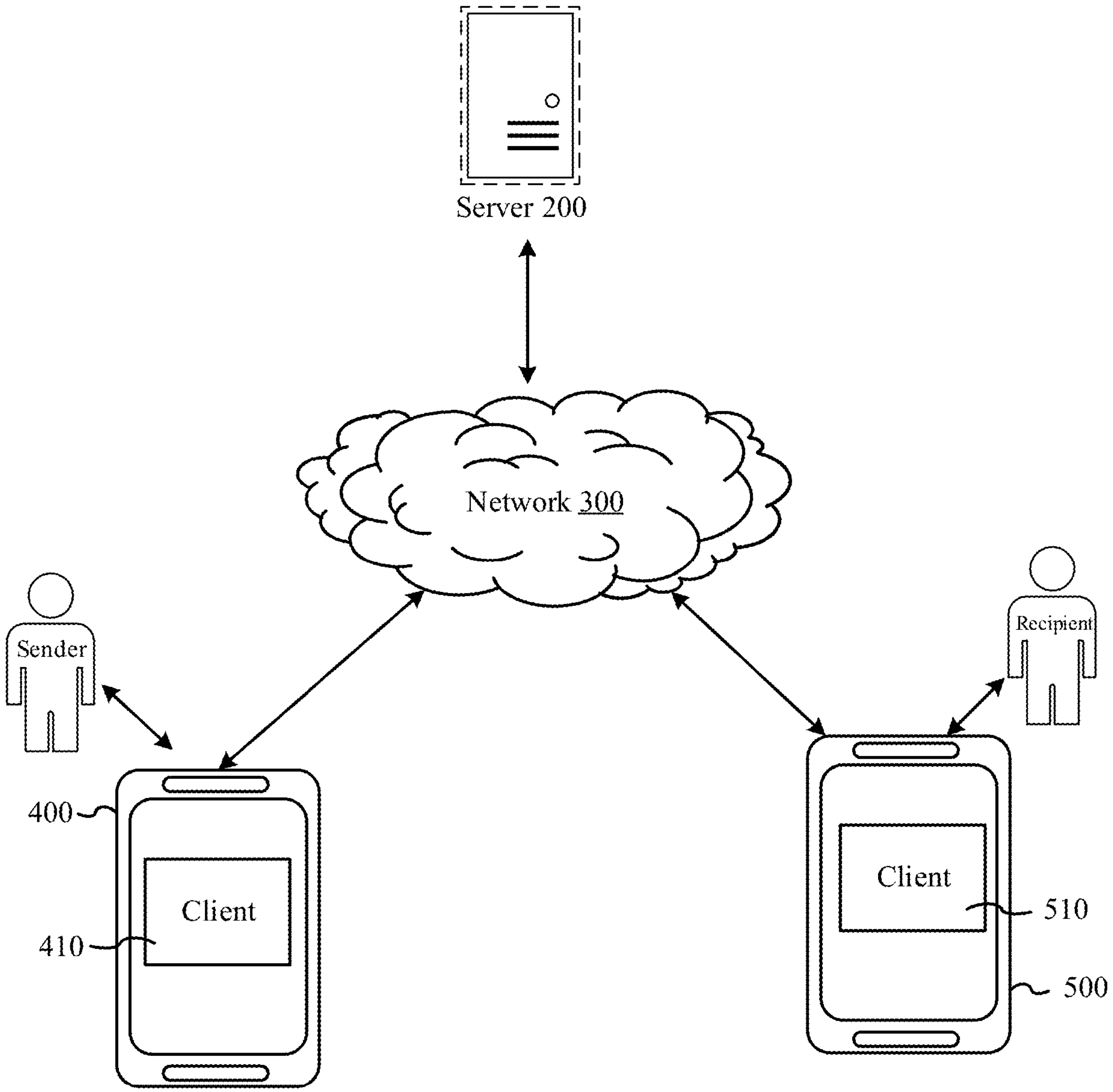
FIG. 1 is a schematic structural diagram of an audio processing system according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, the term “some embodiments” describes subsets of all possible embodiments, but it may be understood that “some embodiments” may be the same subset or different subsets of all the possible embodiments, and can be combined with each other without conflict.

In the following descriptions, the terms “first”, “second”, and “third” are merely intended to distinguish between similar objects rather than describe a specific order of objects. It can be understood that the “first”, “second”, and “third” are interchangeable in order in proper circumstances, so that embodiments of the present disclosure described herein can be implemented in an order other than the order illustrated or described herein.

Unless otherwise defined, meanings of all technical and scientific terms used in this specification are the same as those usually understood by a person skilled in the art to which the present disclosure belongs. The terms used in this specification are merely intended to describe the objectives of embodiments of the present disclosure, but are not intended to limit the present disclosure.

Before embodiments of the present disclosure are further described in detail, terms in embodiments of the present disclosure are described, and the following explanations are applicable to the terms in embodiments of the present disclosure.

(1) Bandwidth extension (BWE), also referred to as spectral band replication, is a classic technology in the audio encoding field. The bandwidth extension technology is a parameter encoding technology. Effective bandwidth may be extended at a receive end through bandwidth extension to improve quality of an audio signal, so that a user can intuitively feel a clearer tone, a larger volume, and higher speech intelligibility.

(2) Quadrature mirror filters (QMF) are a filter pair including analysis-synthesis. Analysis filters are used for subband signal decomposition to reduce signal bandwidth, so that each subband signal can be properly processed by a channel. Synthesis filters are used for synthesis of subband signals recovered from a decoder side, for example, reconstructing an original audio signal through zero-value interpolation, bandpass filtering, or the like.

(4) Modified discrete cosine transform (MDCT) is a type of linear orthogonal overlapping transformation. The MDCT uses a time domain aliasing cancellation technology including a 50% time domain overlapping window, to effectively overcome edge effect in an overlapping window without degrading encoding performance, and effectively remove periodic noise caused by the edge effect.

(5) Spectral band replication (SBR) is a technology for improving a source encoding system. To be specific, spectral bandwidth on an encoder side is reduced, and corresponding audio is replicated on a decoder side. This technology can greatly reduce an encoding bitrate while maintaining same perceived audio quality.

(7) A neural network (NN) is an algorithmic mathematical model that imitates behavioral characteristics of an animal neural network to perform distributed parallel information processing. Depending on system complexity, this type of network adjusts an interconnection relationship between a large number of internal nodes to process information.

In a UWB audio encoding scenario, according to a human hearing mechanism and a psychoacoustic model, a user is usually more sensitive to a low-frequency part of a signal than to a high-frequency part of the signal. In codec processing, a higher bitrate is allocated to the low-frequency part of the signal than to the high-frequency part. However, this does not mean that the high-frequency part is discarded. Absence of the high-frequency part affects a subjective sense of hearing. Therefore, a high-frequency signal needs to be encoded and decoded in the ultra-wideband audio encoding scenario.

In some cases, a high-frequency signal may be parameterized, and a high-frequency part of an audio signal may be reconstructed based on these parameters and a corresponding low-frequency part of the audio signal on a decoder side. In some cases, only spectral envelope information of the high-frequency signal is considered during parameterization encoding on the high-frequency signal, and the high-frequency signal cannot be encoded with stronger characterization. The following problems may exist: In a case that a bandwidth extension solution in the related art is applied to a non-AI-based audio codec, a decoding result has an error, where the error is mainly caused by inaccurate encoding or decoding of a high-frequency signal. In a case that a bandwidth extension solution is applied to an AI-based audio codec, an error in a result obtained after neural network modeling, encoding, and transmission of a low-frequency signal is significantly different from the error in the result obtained by the non-AI-based audio codec, and a decoding result has a larger error. To be specific, an error caused by inaccurate encoding or decoding of a high-frequency signal is more significant. Consequently, a high-frequency part reconstructed on a decoder side has significant noise.

Embodiments of the present disclosure provide an audio processing method and apparatus, an electronic device, a computer-readable storage medium, and a computer program product, to encode spectral flatness information during encoding to improve code integrity of a high-frequency part and improve quality of audio obtained through subsequent decoding. The following describes exemplary application of the electronic device provided in embodiments of the present disclosure. The electronic device provided in embodiments of the present disclosure may be implemented by a terminal or a server, or jointly implemented by a terminal and a server. An example in which the audio processing method provided in embodiments of the present disclosure is jointly implemented by a terminal and a server is used below for description.

FIG. 1 is a schematic architectural diagram of an audio decoding system 100 according to an embodiment of the present disclosure. To support a speech application, as shown in FIG. 1, the audio decoding system 100 includes: a server 200, a network 300, a first terminal 400 (namely, an encoder side), and a second terminal 500 (namely, a decoder side). The network 300 may be a local area network, a wide area network, or a combination thereof.

In some embodiments, a client 410 runs on the first terminal 400, and the client 410 may be various types of clients, for example, an instant messaging client, a web conferencing client, a livestreaming client, or a browser. In response to an audio capture instruction triggered by a sender (for example, an initiator of a network conference, an anchor, or an initiator of a voice call), the client 410 calls a microphone of the first terminal 400 to capture an audio signal, and filters the captured audio signal to obtain a low-frequency signal and a high-frequency signal, where a frequency of the low-frequency signal is lower than that of the high-frequency signal; encodes the low-frequency signal to obtain a bitstream of the low-frequency signal; performs frequency domain transform on the low-frequency signal to obtain a low-frequency spectrum, and performs frequency domain transform on the high-frequency signal to obtain a high-frequency spectrum; performs spectral envelope extraction on the low-frequency spectrum and the high-frequency spectrum to obtain spectral envelope information of the audio signal, and performs spectral flatness extraction on the high-frequency spectrum to obtain spectral flatness information of the high-frequency spectrum; and performs quantization encoding on the spectral flatness information of the high-frequency spectrum and the spectral envelope information of the audio signal to obtain a bandwidth extension bitstream of the audio signal, and combines the bandwidth extension bitstream and the bitstream of the low-frequency signal into an encoded bitstream of the audio signal. Then the client 410 may transmit the encoded bitstream to the server 200 through the network 300, so that the server 200 transmits the bitstream to the second terminal 500 associated with a recipient (for example, a participant of the network conference, an audience, or a recipient of the voice call). After receiving the encoded bitstream transmitted by the server 200, a client 510 (for example, an instant messaging client, a web conferencing client, a livestreaming client, or a browser) splits the encoded bitstream to obtain the bandwidth extension bitstream and the bitstream of the low-frequency signal; decodes the bitstream of the low-frequency signal to obtain the low-frequency signal, and performs frequency domain transform on the low-frequency signal to obtain a low-frequency spectrum of the low-frequency signal; dequantizes the bandwidth extension bitstream to obtain spectral flatness information and spectral envelope information; performs high-frequency spectrum reconstruction based on the spectral flatness information, the spectral envelope information, and the low-frequency spectrum to obtain a high-frequency spectrum, a frequency of the high-frequency spectrum being higher than that of the low-frequency spectrum; and performs time domain transform on the high-frequency spectrum to obtain a high-frequency signal, and synthesizes the low-frequency signal and the high-frequency signal to obtain an audio signal corresponding to the encoded bitstream.

The audio processing method provided in embodiments of the present disclosure may be widely used in various voice call application scenarios, for example, a voice call on an instant messaging client, a voice call in a game application, or a voice call on a web conferencing client.

For example, a web conferencing scenario is used as an example. Web conferencing is an important part of online office. In a web conference, when capturing a speech signal of a speaker, a sound capture apparatus (for example, a microphone) of a participant of the web conference needs to transmit the captured speech signal to other participants of the web conference. This process includes transmission and play of the speech signal among a plurality of participants.

In this scenario, the audio processing method provided in embodiments of the present disclosure may be used to encode and decode the speech signal in the network conference, to make encoding and decoding of a high-frequency signal in the speech signal more efficient and accurate, and improve quality of a voice call in the network conference.

In some other embodiments, embodiments of the present disclosure may be implemented by using a cloud technology. The cloud technology is a hosting technology that integrates a series of resources such as hardware, software, and network resources in a wide area network or a local area network implement data computing, storage, processing, and sharing.

The cloud technology is a general term for a network technology, an information technology, an integration technology, a management platform technology, an application technology, and the like that are based on application of a cloud computing business model, and may constitute a resource pool for use on demand and therefore is flexible and convenient. A cloud computing technology is to become an important support. A function of service interaction between servers 200 may be implemented by using a cloud technology.

For example, the server 200 shown in FIG. 1 may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The first terminal 400 and the second terminal 500 shown in FIG. 1 each may be a smartphone, a tablet computer, a notebook computer, a desktop computer, a smart speaker, a smartwatch, a smart speech interaction device, a smart home appliance, a vehicle-mounted terminal, an aircraft, or the like, but is not limited thereto. The terminal (for example, the first terminal 400 and the second terminal 500) and the server 200 may be directly or indirectly connected in a wired or wireless communication manner. This is not limited in embodiments of the present disclosure.

In some embodiments, the terminal (for example, the second terminal 500) or the server 200 may alternatively implement the audio processing method provided in embodiments of the present disclosure by running a computer program. For example, the computer program may be a native program or software module in an operating system. The computer program may be a native application (APP), to be specific, a program that needs to be installed in an operating system to run, for example, a livestreaming APP, a web conferencing APP, or an instant messaging APP; or may be a mini program, to be specific, a program that only needs to be downloaded to a browser environment to run. To sum up, the computer program may be an application, a module, or a plug-in in any form.

Figure 2A:
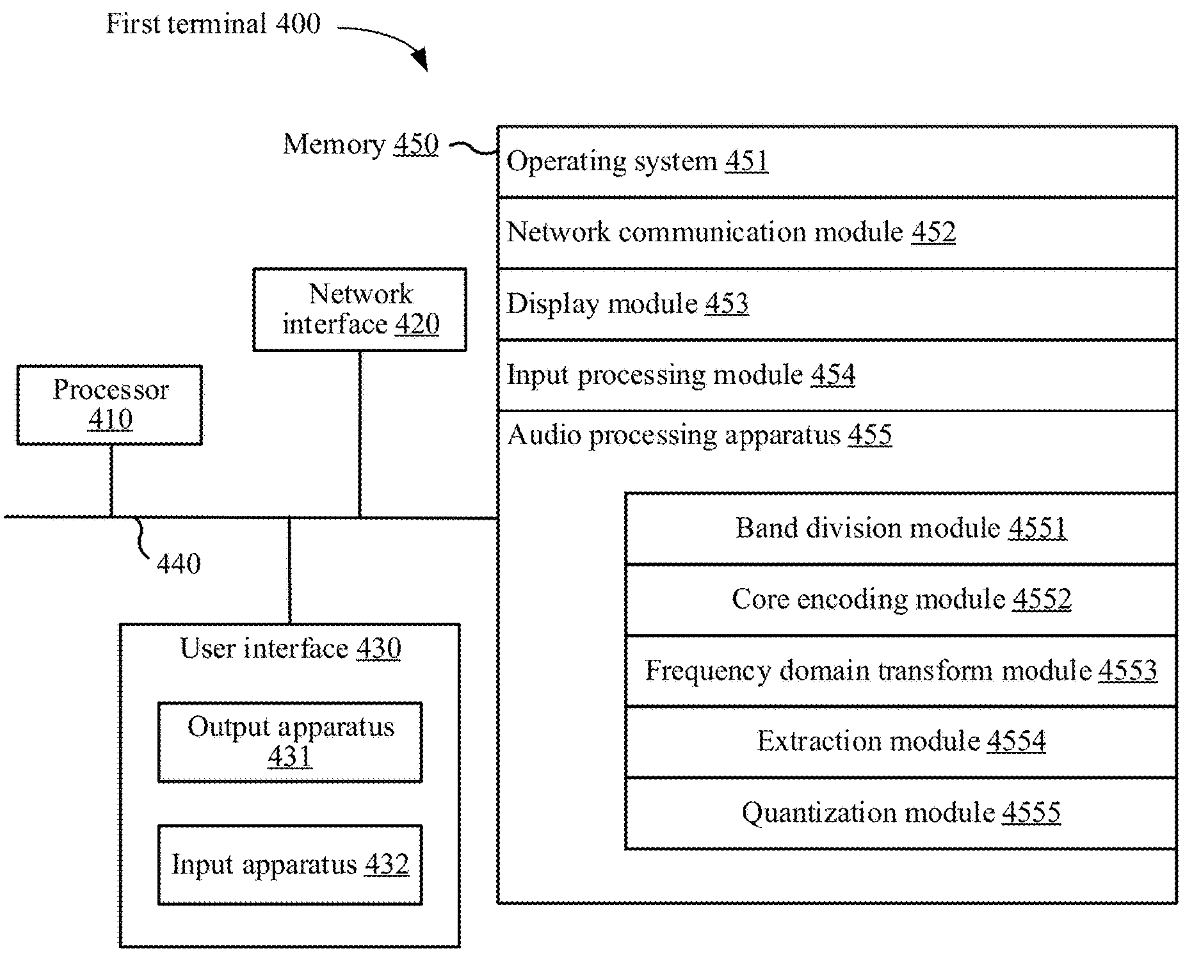
FIG. 2A and FIG. 2B are schematic structural diagrams of an electronic device according to an embodiment of the present disclosure.

FIG. 2A is a schematic structural diagram of an electronic device according to an embodiment of the present disclosure. A first terminal 400 shown in FIG. 2A includes: at least one processor 410, a memory 450, at least one network interface 420, and a user interface 430. The components of the first terminal 400 are coupled together by using a bus system 440. It may be understood that, the bus system 440 is configured to implement connection and communication between the components. In addition to a data bus, the bus system 440 further includes a power bus, a control bus, and a state signal bus. However, for clarity of description, various buses are marked as the bus system 440 in FIG. 2A.

The processor 410 may be an integrated circuit chip with a signal processing capability, for example, a general-purpose processor, a digital signal processor (DSP), another programmable logic device, a discrete gate or transistor logic device, or a discrete hardware component. The general-purpose processor may be a microprocessor, any processor, or the like.

The user interface 430 includes one or more output apparatuses 431 capable of displaying media content, including one or more speakers and/or one or more visual display screens. The user interface 430 further includes one or more input apparatuses 432, including user interface components for facilitating user input, for example, a keyboard, a mouse, a microphone, a touch display screen, a camera, or another input button or control.

The memory 450 may be a removable memory, a non-removable memory, or a combination thereof. Exemplary hardware devices include a solid-state memory, a hard disk drive, an optical disc drive, and the like. The memory 450 may include one or more storage devices physically located away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of the present disclosure is intended to include any suitable type of memory.

In some embodiments, the memory 450 is capable of storing data to support various operations. Examples of the data include a program, a module, and a data structure or a subset or superset thereof. Examples are described below:

- an operating system 451, including system programs for processing various basic system services and performing hardware-related tasks, for example, a framework layer, a core library layer, and a driver layer for implementing various basic services and processing hardware-based tasks;
- a network communication module 452, configured to reach another electronic device through one or more (wired or wireless) network interfaces 420, exemplary network interfaces 420 including Bluetooth, wireless fidelity (Wi-Fi), universal serial bus (USB), and the like;
- a display module 453, configured to display information by using one or more output apparatuses 431 (for example, a display screen or a speaker) associated with the user interface 430 (for example, a user interface for operating a peripheral device and displaying content and information); and
- an input processing module 454, configured to detect one or more user inputs or interactions from one or more input apparatuses 432 and translate the detected inputs or interactions.

In some embodiments, an apparatus provided in embodiments of the present disclosure may be implemented by using software. FIG. 2A shows an audio processing apparatus 455 stored in the memory 450. The audio processing apparatus 455 may be software in the form of a program or a plug-in, and includes the following software modules: a band division module 4551, a core module 4552, a frequency domain transform module 4553, an extraction module 4554, and a quantization module 4555. These modules are logical modules, and therefore may be flexibly combined or further split based on an implemented function. Functions of the modules are described below.

Figure 2B:
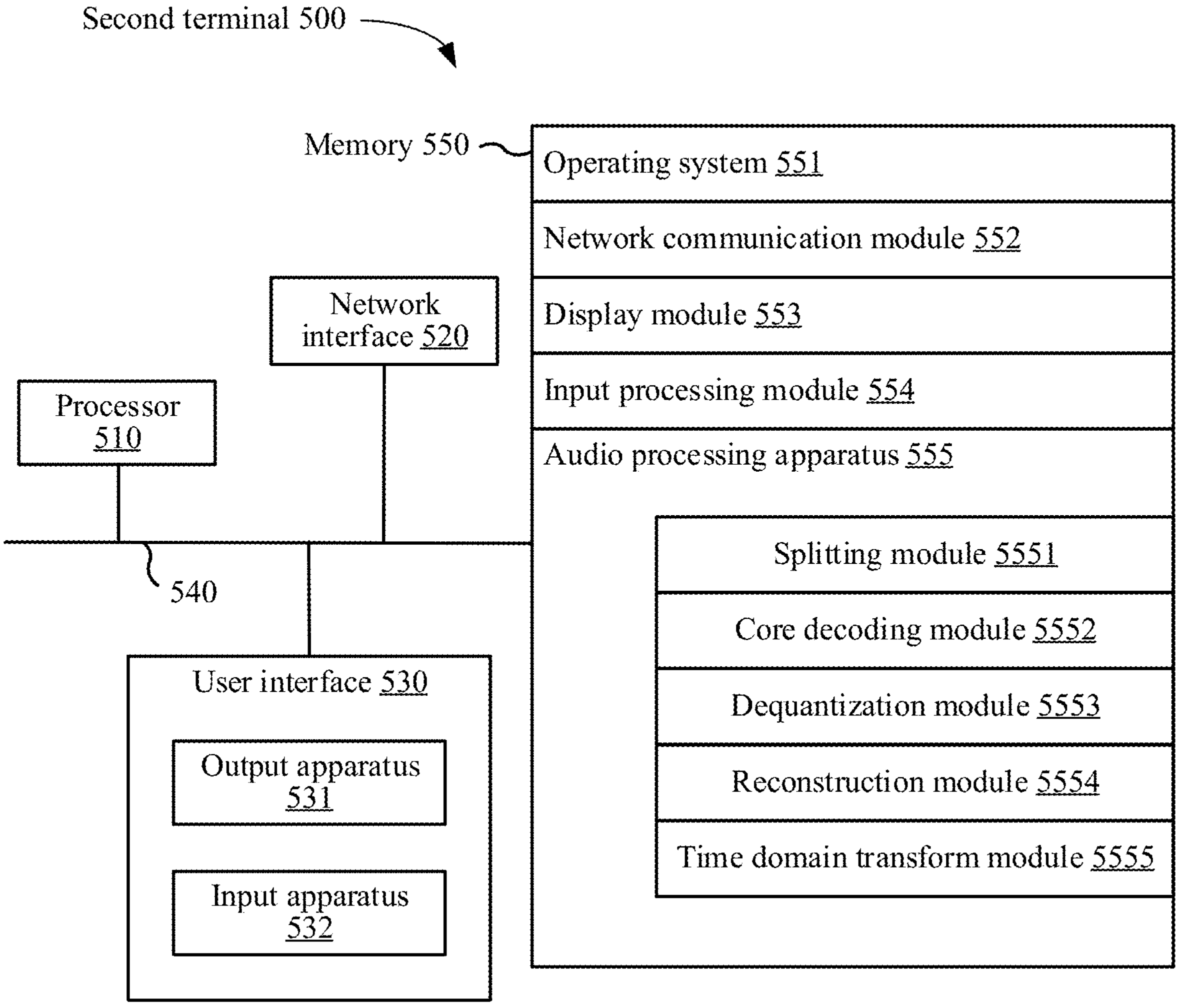

FIG. 2B is a schematic structural diagram of an electronic device according to an embodiment of the present disclosure. A second terminal 500 shown in FIG. 2B includes: at least one processor 510, a memory 550, at least one network interface 520, and a user interface 530. The components of the second terminal 500 are coupled together by using a bus system 540. The user interface 530 includes one or more output apparatuses 531 capable of displaying media content. The user interface 530 further includes one or more input apparatuses 532. The memory 550 further includes: an operating system 551, a network communication module 552, a display module 553, and an input processing module 554.

In some embodiments, an apparatus provided in embodiments of the present disclosure may be implemented by using software. FIG. 2B shows an audio processing apparatus 555 stored in the memory 550. The audio processing apparatus 555 may be software in the form of a program or a plug-in, and includes the following software modules: a splitting module 5551, a decoding module 5552, a dequantization module 5553, a reconstruction module 5554, and a time domain transform module 5555. These modules are logical modules, and therefore may be flexibly combined or further split based on an implemented function. Functions of the modules are described below.

The following describes an audio decoding method provided in embodiments of the present disclosure from the perspective of interaction between a first terminal device (namely, an encoder side), a server, and a second terminal device (namely, a decoder side).

Figure 3A:
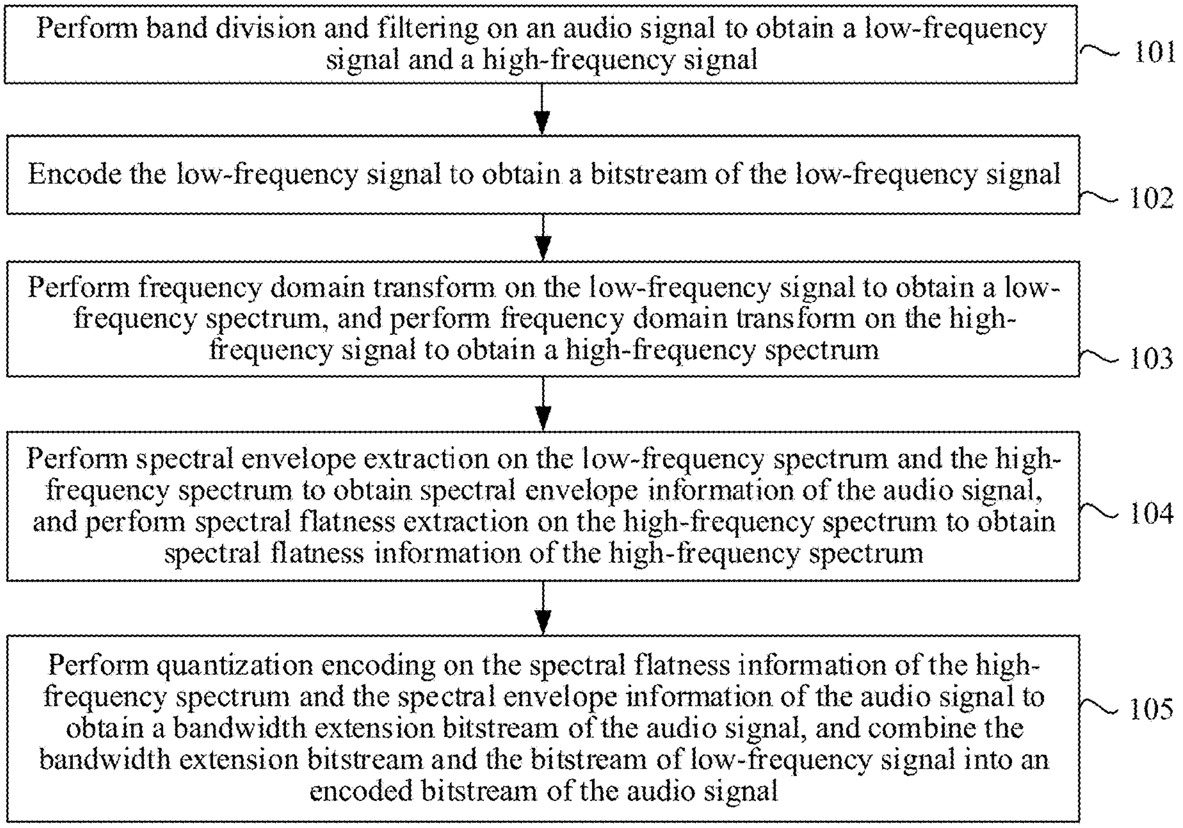
FIG. 3A to FIG. 3D are schematic flowcharts of an audio processing method according to an embodiment of the present disclosure.

FIG. 3A is a schematic flowchart of an audio processing method according to an embodiment of the present disclosure. The method is described with reference to steps shown in FIG. 3A. The steps shown in FIG. 3A are performed by a first terminal device (namely, an encoder side).

Steps performed by a terminal device are specifically performed by a client running on the terminal device. For ease of description, a terminal device and a client running on a terminal device are not specifically distinguished in the present disclosure. The audio decoding method provided in embodiments of the present disclosure may be performed by various forms of computer programs running on a terminal device. The computer program is not limited to a client running on the terminal device, may alternatively be an operating system, a software module, a script, or a mini program in the foregoing descriptions. Therefore, a client used as an example below is not to be construed as a limitation on embodiments of the present disclosure.

In step 101, an audio signal is filtered to obtain a low-frequency signal and a high-frequency signal.

In an example, a frequency of the low-frequency signal is lower than that of the high-frequency signal. The high-frequency signal is a signal with a frequency greater than 3 MHz. The low-frequency signal is a signal with a frequency ranging from 30 kilohertz (kHz) to 300 kHz. The audio signal is an ultra-wideband signal with a sampling rate of 32 kHz. The sampling rate of 32 kHz indicates that 32,000 sampling points are obtained through 32,000 times of sampling per second. The audio signal is divided into frames based on a frame length of 640 points. To be specific, the audio signal is divided into frames by using 640 sampling points as one frame. A frame length of each frame is 640 points, and duration of each frame is 0.02 seconds. The audio signal is filtered by QMF band division filters to obtain a high-frequency part (the high-frequency signal) of the signal that has a frame length of 320 points and a low-frequency part (the low-frequency signal) with a frame length of 320 points.

In step 102, the low-frequency signal is encoded to obtain a bitstream of the low-frequency signal.

In some embodiments, the encoding the low-frequency signal to obtain the bitstream of the low-frequency signal in step 102 may be implemented by using the following technical solution: performing feature extraction on the low-frequency signal to obtain a first feature of the low-frequency signal; and performing quantization encoding on the first feature to obtain the bitstream of the low-frequency signal of the audio signal.

In an example, the encoding is processing for compressing the low-frequency signal while retaining information carried in the low-frequency signal. The encoding may be performed by using a regular encoding technology, or may be encoding based on a deep learning technology. For example, the low-frequency signal may be encoded by using a deep learning-based Penguins speech engine, and feature extraction is performed on the low-frequency signal by using a neural network model to obtain a feature vector (the first feature). Data dimensionality of the feature vector is lower than that of the low-frequency signal. Vector quantization or scalar quantization is performed on the feature vector corresponding to the low-frequency signal to obtain an index value. Entropy encoding is performed on the index value to obtain the bitstream of the low-frequency signal.

In an example, an entire dynamic range of the feature vector of the low-frequency signal is divided into a plurality of intervals, and each interval has a representative value. A feature vector falling within the interval during quantization is replaced with the representative value. In this case, the feature vector is a one-dimensional vector. Therefore, this is also referred to as scalar quantization. The vector quantization is an expansion and an extension of the scalar quantization. A plurality of pieces of scalar data constitute a vector. The vector quantization is quantization performed on a vector. During vector quantization, vector space is divided into a plurality of small regions. A representative vector is found for each small region. A vector falling within the small region during quantization is replaced with the representative vector.

In embodiments of the present disclosure, a feature vector (the first feature) whose dimensionality is much lower than original signal dimensionality is generated by using the neural network model, and then low-bitrate encoding can be implemented through entropy encoding or another technology.

In step 103, frequency domain transform is performed on the low-frequency signal to obtain a low-frequency spectrum, and frequency domain transform is performed on the high-frequency signal to obtain a high-frequency spectrum.

In an example, frequency domain transform may be MDCT. MDCT is performed on the high-frequency signal to obtain the high-frequency spectrum (including a plurality of spectral coefficients), or DCT may be performed on the high-frequency signal to obtain the high-frequency spectrum (including a plurality of spectral coefficients). MDCT is performed on the low-frequency signal to obtain the low-frequency spectrum (including a plurality of spectral coefficients), or DCT may be performed on the low-frequency signal to obtain the low-frequency spectrum (including a plurality of spectral coefficients).

In step 104, spectral envelope extraction is performed on the low-frequency spectrum and the high-frequency spectrum to obtain spectral envelope information of the audio signal, and spectral flatness extraction is performed on the high-frequency spectrum to obtain spectral flatness information of the high-frequency spectrum.

The spectrum is first explained below. The audio signal is a time domain signal. For a timing signal, a horizontal axis represents time, and a vertical axis represents an amplitude. For example, amplitudes (which may represent a volume) of audio frames are different. A regularity of a frequency changing with time cannot be indicated. Therefore, frequency domain analysis (for example, Fourier transform) needs to be performed on the time domain signal to obtain a spectrum graph. The spectrum graph may represent a spectral range of the audio signal. Specifically, the time domain signal may be decomposed into a direct current component (namely, a constant) and a sum of a plurality of sinusoidal signals. Each sinusoidal component has its own frequency and amplitude. In this case, frequency values constitute a horizontal axis, and amplitudes constitute a vertical axis. Amplitudes of the several sinusoidal signals are drawn on corresponding frequencies to obtain an amplitude and frequency distribution graph of the signal, namely, a spectrum graph shown in FIG. 9.

Figure 9:
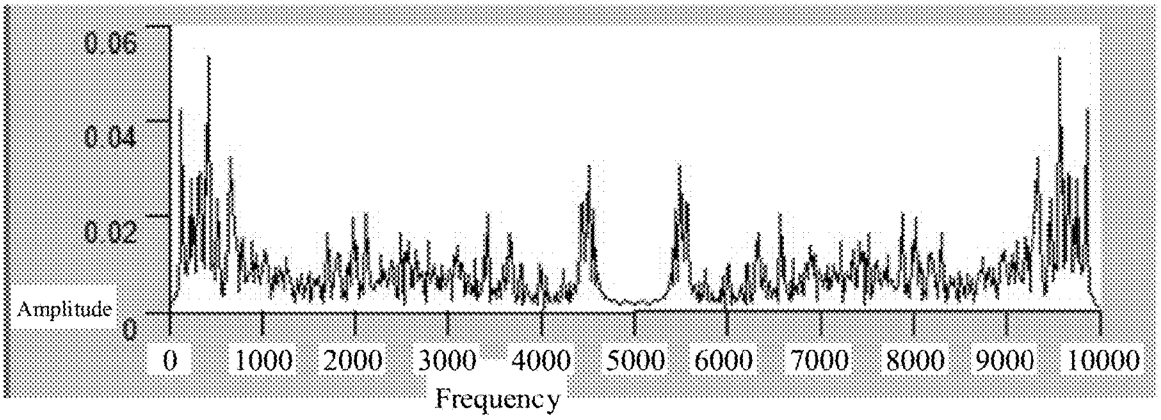
FIG. 9 is a schematic diagram of a spectrum according to an embodiment of the present disclosure.

In an example, a frequency range represented by the spectrum shown in FIG. 9 is 0 Hz to 10,000 Hz. It can be learned from FIG. 9 that the amplitude increases or decreases with a change of the frequency. Herein, a curve formed by connecting highest points in the spectrum graph (wave peaks in the spectrum graph) that exist before each decrease of the amplitude is referred to as a spectral envelope curve. The spectral envelope extraction is to extract information represented by a low-frequency spectral envelope curve, namely, low-frequency spectral envelope information, from the low-frequency spectrum, and extract information represented by a high-frequency spectral envelope curve, namely, high-spectral envelope information, from the high-frequency spectrum. The low-frequency spectral envelope curve herein is a curve formed by connecting highest points, in a spectrum graph corresponding to a low frequency band part in FIG. 9, that exist before each decease of the amplitude. The high-frequency spectral envelope curve herein is a curve formed by connecting highest points, in a spectrum graph corresponding to a high frequency band part in FIG. 9, that exist before each decease of the amplitude.

In some embodiments, the performing spectral envelope extraction on the low-frequency spectrum and the high-frequency spectrum to obtain the spectral envelope information of the audio signal in step 104 may be implemented by using the following technical solution: performing spectral envelope extraction on the low-frequency spectrum to obtain low-frequency spectral envelope information of the low-frequency spectrum; performing spectral envelope extraction on the high-frequency spectrum to obtain high-frequency spectral envelope information of the high-frequency spectrum; and combining the low-frequency spectral envelope information and the high-frequency spectral envelope information into the spectral envelope information of the audio signal.

In embodiments of the present disclosure, the spectral envelope information may be extracted to encode energy of the low-frequency signal and the high-frequency signal during bandwidth extension encoding. This improves validity of encoding, so that better restoration effect can be achieved in subsequent decoding.

The following separately describes a specific implementation of performing spectral envelope extraction on the low-frequency spectrum to obtain the low-frequency spectral envelope information of the low-frequency spectrum and a specific implementation of performing spectral envelope extraction on the high-frequency spectrum to obtain the high-frequency spectral envelope information of the high-frequency spectrum.

In some embodiments, the performing spectral envelope extraction on the high-frequency spectrum to obtain the high-frequency spectral envelope information of the high-frequency spectrum may be implemented by using the following technical solution: obtaining second fusion configuration data of the high-frequency spectrum, the second fusion configuration data including a spectral line sequence number of each second spectral line combination; and performing the following processing on each second spectral line combination: extracting a spectral coefficient corresponding to each spectral line sequence number of the second spectral line combination from the high-frequency spectrum; squaring the spectral coefficient of each spectral line sequence number to obtain a second squared spectral coefficient of each spectral line sequence number; in a case that the second spectral line combination includes a plurality of spectral line sequence numbers, summing second squared spectral coefficients of the plurality of spectral line sequence numbers to obtain a second summation result; performing logarithmic processing on (e.g., finding a logarithm of) the second summation result to obtain second fusion spectral envelope information corresponding to the second spectral line combination; and generating the high-frequency spectral envelope information based on second fusion spectral envelope information of at least one second spectral line combination.

In an example, the second fusion configuration data may be stored in local storage of a terminal or on a server in the form of a data table, so that the first terminal device can directly read the data from the local storage of the terminal or obtain the data from the server. For a specific example of the second fusion configuration data, refer to Table 1. It can be learned from Table 1 that the second fusion configuration data includes four second spectral line combinations. Spectral line sequence numbers of a second spectral line combination 1 range from 0 to 19. Spectral line sequence numbers of a second spectral line combination 2 range from 20 to 54. Spectral line sequence numbers of a second spectral line combination 3 range from 55 to 89. Spectral line sequence numbers of a second spectral line combination 4 range from 90 to 130. Each spectral line has its own spectral coefficient.

TABLE 1

Envelope fusion table for the high-frequency part

| Spectral envelope sequence number | Spectral line sequence number |
|---|---|
| 1 | 0 |
| 2 | 20 |
| 3 | 55 |
| 4 | 90 |
| | 130 |

In an example, spectral coefficients of the high-frequency spectrum are fused based on Table 1 to extract spectral envelope information of each second spectral line combination in the high-frequency spectrum. Refer to a formula (1):

$$\text{Spec\_env}(i) = 0.5 * \log_2\left(\sum_{k=table(i)}^{table(i+1)} m_k^2\right) \quad (1)$$

$m_k$ represents a spectral coefficient of a spectrum with a spectral line sequence number of k in the high-frequency spectrum (obtained through MDCT transform). i represents the spectral envelope sequence number (a sequence number of a second spectral line combination). For example, in a case that i is 1, $$\sum_{k=table(1)}^{table(2)} m_k^2$$

is obtained by squaring each of $m_0$, $m_1$, . . . , and $m_{19}$ and summing squared results. Spec_env(i) represents second fusion spectral envelope information of a second spectral line combination with a spectral envelope sequence number of i.

A second spectral line combination with a spectral envelope sequence number of 1 is used below as an example for detailed description. It can be learned from Table 1 that a quantity of second spectral line combinations is 4. For a second spectral line combination A with a spectral envelope sequence number of 1, a spectral coefficient corresponding to each spectral line sequence number of the second spectral line combination A is extracted from the high-frequency spectrum. To be specific, a spectral coefficient $m_0$ of a spectrum with a spectral line sequence number of 0 to a spectral coefficient $m_{19}$ of a spectrum with a spectral line sequence number of 19 are extracted. The spectral coefficient for each spectral line sequence number is squared to obtain a second squared spectral coefficient $m_k^2$ for each spectral line sequence number, for example, $$m_0^2, m_1^2, \ldots, \text{and } m_{19}^2.$$

The second spectral line combination A has 20 spectral line sequence numbers. In a case that the second spectral line combination A has a plurality of spectral line sequence numbers, second squared spectral coefficients for the plurality of spectral line sequence numbers are summed to obtain a second summation result $$\sum_{k=table(1)}^{table(2)} m_k^2.$$

This is equivalent to summing 20 second squared spectral coefficients. Logarithmic processing is performed on the second summation result to obtain second fusion spectral envelope information Spec_env(1) corresponding to the second spectral line combination. In a case that a second spectral line combination B has one spectral line sequence number, logarithmic processing is performed on a second squared spectral coefficient corresponding to the only spectral line sequence number to obtain second fusion spectral envelope information corresponding to the second spectral line combination. In a case that a plurality of second spectral line combinations exist, second fusion spectral envelope information Spec_env(i) of the plurality of second spectral line combinations is combined into the high-frequency spectral envelope information. In a case that one second spectral line combination exists, second fusion spectral envelope information Spec_env(i) of the second spectral line combination is used as the high-frequency spectral envelope information.

In embodiments of the present disclosure, spectral envelope information fusion is performed on the spectrum of the high-frequency signal based on the second fusion configuration data. The second fusion configuration data is used for representing spectral lines that need to be fused, and is obtained by comprehensively considering BWE quality and a bitrate in a specific experiment with a critical band in a psychoacoustic model as a theoretical basis. The critical band is a result obtained based on psychoacoustic experiments, and specifically indicates conversion between physical mechanical stimulation and neural electrical stimulation at a cochlea of a human ear. For a pure-tone audio signal with a specific frequency or a pure-tone audio signal with a specific frequency with another frequency within a specific range near a human ear, neural electrical stimulation obtained through conversion by the human ear remains consistent. This means that no excessively high bitrate needs to be used to achieve an excessively high resolution in frequency domain. It is found through a plurality of experiments and tests that a desirable bitrate and good audio quality can be achieved in a case that an energy envelope selection range for the high-frequency part is the second fusion configuration data.

In some embodiments, the performing spectral envelope extraction on the low-frequency spectrum to obtain the low-frequency spectral envelope information of the low-frequency spectrum may be implemented by using the following technical solution: obtaining first fusion configuration data of the low-frequency spectrum, the first fusion configuration data including a spectral line sequence number of each first spectral line combination; and performing the following processing on each first spectral line combination: extracting a spectral coefficient corresponding to each spectral line sequence number of the first spectral line combination from the low-frequency spectrum; squaring the spectral coefficient of each spectral line sequence number to obtain a first squared spectral coefficient of each spectral line sequence number; in a case that the first spectral line combination includes a plurality of spectral line sequence numbers, summing first squared spectral coefficients of the plurality of spectral line sequence numbers to obtain a first summation result; performing logarithmic processing on the first summation result to obtain first fusion spectral envelope information corresponding to the first spectral line combination; and generating the low-frequency spectral envelope information based on first fusion spectral envelope information of at least one first spectral line combination.

In an example, the first fusion configuration data may be stored in local storage of a terminal or on a server in the form of a data table, so that the first terminal device can directly read the data from the local storage of the terminal or obtain the data from the server. For a specific example of the first fusion configuration data, refer to Table 2. It can be learned from Table 2 that the first fusion configuration data includes one first spectral line combination. Spectral line sequence numbers of a first spectral line combination 1 range from 80 to 150. Each spectral line has its own spectral coefficient.

TABLE 2

Envelope fusion table for the low-frequency part

| Spectral envelope sequence number | Sequence number of a spectral coefficient |
|---|---|
| 1 | 80<br>150 |

In an example, spectral coefficients of the low-frequency spectrum are fused based on Table 2 to extract spectral envelope information of each first spectral line combination in the low-frequency spectrum. Refer to a formula (2):

$$\text{Spec\_env}(i) = 0.5 * \log_2\left(\sum_{k=table(i)}^{table(i+1)} m_k^2\right) \quad (2)$$

$m_k$ represents a spectral coefficient of a spectrum with a spectral line sequence number of k in the low-frequency spectrum (obtained through MDCT transform). i represents the spectral envelope sequence number (a sequence number of a first spectral line combination). For example, in a case that i is 1, $$\sum_{k=table(1)}^{table(2)} m_k^2$$

is obtained by squaring each of $m_{80}$, $m_{81}$, . . . , and $m_{149}$ and summing squared results. Spec_env(i) represents first fusion spectral envelope information of a first spectral line combination with a spectral envelope sequence number of i.

A first spectral line combination with a spectral envelope sequence number of 1 is used below as an example for detailed description. It can be learned from Table 2 that a quantity of first spectral line combinations is 1. For a first spectral line combination A with a spectral envelope sequence number of 1, a spectral coefficient corresponding to each spectral line sequence number of the first spectral line combination A is extracted from the low-frequency spectrum. To be specific, a spectral coefficient $m_{80}$ of a spectrum with a spectral line sequence number of 80 to a spectral coefficient $m_{150}$ of a spectrum with a spectral line sequence number of 150 are extracted. The spectral coefficient for each spectral line sequence number is squared to obtain a first squared spectral coefficient $$m_k^2$$

for each spectral line sequence number, for example, $$m_{80}^2, m_{81}^2, \ldots, \text{and } m_{150}^2.$$

The first spectral line combination A has 71 spectral line sequence numbers. In a case that the first spectral line combination has a plurality of spectral line sequence numbers, first squared spectral coefficients for the plurality of spectral line sequence numbers are summed to obtain a first summation result $$\sum_{k=table(1)}^{table(2)} m_k^2.$$

This is equivalent to summing 71 first squared spectral coefficients. Logarithmic processing is performed on the first summation result to obtain first fusion spectral envelope information Spec_env(1) corresponding to the first spectral line combination. In a case that a first spectral line combination B has one spectral line sequence number, logarithmic processing is performed on a first squared spectral coefficient corresponding to the only spectral line sequence number to obtain first fusion spectral envelope information corresponding to the first spectral line combination. In a case that a plurality of first spectral line combinations exist, first fusion spectral envelope information Spec_env(i) of the plurality of first spectral line combinations is combined into the low-frequency spectral envelope information. In a case that one first spectral line combination exists, first fusion spectral envelope information Spec_env(i) of the first spectral line combination is used as the low-frequency spectral envelope information.

In embodiments of the present disclosure, spectral envelope information of the spectrum of the low-frequency signal is fused based on the first fusion configuration data. The first fusion configuration data is used for representing spectral lines that need to be fused, and is obtained through experimental statistical tests. In a case that the low-frequency signal is encoded through AI-based ultra-wideband speech encoding, because the AI-based ultra-wideband speech encoding has a strong speech modeling capability and a noise reduction capability, a variable needs to be introduced to measure and estimate noise reduction effect. An energy envelope of the low-frequency part may be used as a variable for estimation. It is found through statistical tests with large-scale data sets that a desirable bitrate and good audio quality can be achieved in a case that an energy envelope selection range for the low-frequency part is the first fusion configuration result.

In some embodiments, the performing spectral flatness extraction on the high-frequency spectrum to obtain the spectral flatness information of the high-frequency spectrum in step 104 may be implemented by using the following technical solution: obtaining third fusion configuration data of the high-frequency spectrum, the third fusion configuration data including a spectral line sequence number of each third spectral line combination; and performing the following processing on each third spectral line combination: obtaining a geometric mean of the third spectral line combination, and obtaining an arithmetic mean of the third spectral line combination; using a ratio of the geometric mean of the third spectral line combination to the arithmetic mean of the third spectral line combination as spectral flatness information of the third spectral line combination; and generating the spectral flatness information of the high-frequency spectrum based on spectral flatness information of at least one third spectral line combination.

In an example, the third fusion configuration data may be stored in local storage of a terminal or on a server in the form of a data table, so that the first terminal device can directly read the data from the local storage of the terminal or obtain the data from the server. For a specific example of the third fusion configuration data, refer to Table 3. It can be learned from Table 3 that the third fusion configuration data includes two third spectral line combinations. Spectral line sequence numbers of a third spectral line combination 1 range from 0 to 39. Spectral line sequence numbers of a third spectral line combination 2 range from 40 to 80. Each spectral line has its own spectral coefficient.

TABLE 3

Spectral flatness information fusion table for the high-frequency part

| Sequence number of a third spectral line combination | Spectral line sequence number |
|---|---|
| 1 | 0 |
| 2 | 40 |
| | 80 |

In an example, spectral coefficients of the high-frequency spectrum are fused based on Table 3 to extract spectral flatness information of each third spectral line combination in the high-frequency spectrum. Refer to a formula (3):

$$\text{Flatness}(i) = \frac{nume(i)}{deno(i)} \tag{3}$$

nume(i) and demo(i) respectively represent a geometric mean and an arithmetic mean of an $i^{th}$ third spectral line combination in the high-frequency spectrum. Spectral flatness information Flatness(i) is a ratio of the geometric mean of the $i^{th}$ third spectral line combination to the arithmetic mean of the $i^{th}$ third spectral line combination. i represents a sequence number of the third spectral line combination.

A third spectral line combination with a sequence number of 1 is used below as an example for detailed description. It can be learned from Table 3 that a quantity of third spectral line combinations is 2. For the first spectral line combination A shown in Table 3, a spectral coefficient corresponding to each spectral line sequence number of the third spectral line combination A is extracted from the high-frequency spectrum. To be specific, a spectral coefficient $m_0$ of a spectrum with a spectral line sequence number of 0 to a spectral coefficient $m_{39}$ of a spectrum with a spectral line sequence number of 39 are extracted. An arithmetic mean and a geometric mean of the third spectral line combination A are determined based on the spectral coefficient $m_0$ of the spectrum with a spectral line sequence number of 0 to the spectral coefficient $m_{39}$ of the spectrum with a spectral line sequence number of 39, so that a ratio of the geometric mean to the arithmetic mean is used as spectral flatness information of the third spectral line combination A. In a case that a plurality of third spectral line combinations exist, spectral flatness information Flatness(i) of the plurality of third spectral line combinations is combined into the spectral flatness information of the high-frequency spectrum. In a case that one third spectral line combination exists, spectral flatness information Flatness(i) of the third spectral line combination is used as the spectral flatness information of the high-frequency spectrum.

The spectral flatness fusion table 3 for the high-frequency part is obtained by comprehensively considering BWE quality and a bitrate in a specific experiment with a critical band in a psychoacoustic model as a theoretical basis. The critical band is a result obtained based on psychoacoustic experiments, and specifically indicates conversion between physical mechanical stimulation and neural electrical stimulation at a cochlea of a human ear. For a pure-tone audio signal with a specific frequency or a pure-tone audio signal with a specific frequency with another frequency within a specific range near a human ear, neural electrical stimulation obtained through conversion by the human ear remains consistent. This means that no excessively high bitrate needs to be used to achieve an excessively high resolution in frequency domain. It is found through statistical tests with large-scale data sets that a desirable bitrate and good audio quality can be achieved in a case that a spectral flatness fusion selection range for the high-frequency part is the third fusion configuration result.

In some embodiments, the obtaining the geometric mean of the third spectral line combination may be implemented by using the following technical solution: extracting a spectral coefficient corresponding to each spectral line sequence number of the third spectral line combination from the high-frequency spectrum; squaring the spectral coefficient of each spectral line sequence number to obtain a third squared spectral coefficient of each spectral line sequence number; in a case that the third spectral line combination includes a plurality of spectral line sequence numbers, performing product processing on (e.g., multiplying) third squared spectral coefficients of the plurality of spectral line sequence numbers to obtain a first product result; and performing square root calculation on the first product result based on a quantity of spectral line sequence numbers to obtain the geometric mean corresponding to the third spectral line combination.

In an example, for a calculation process for the geometric mean, refer to a formula (4):

$$nume(i) = \sqrt[table(i+1)-table(i)]{\prod_{k-table(i)}^{table(i+1)} m_k^2} \tag{4}$$

With reference to the foregoing example, for the third spectral line combination A with a sequence number of 1 (i is 1), a spectral coefficient corresponding to each spectral line sequence number of the third spectral line combination A is extracted from the high-frequency spectrum. To be specific, a spectral coefficient $m_0$ of a spectrum with a spectral line sequence number of 0 to a spectral coefficient $m_{39}$ of a spectrum with a spectral line sequence number of 39 are extracted. The spectral coefficient for each spectral line sequence number is squared to obtain a third squared spectral coefficient $$m_k^2$$

for each spectral line sequence number, for example, $$m_0^2$$

and $$m_1^2.$$

In a case that the third spectral line combination includes a plurality of spectral line sequence numbers, product processing is performed on third squared spectral coefficients of the plurality of spectral line sequence numbers to obtain a first product result $$\prod_{k=table(i)}^{table(i+1)} m_k^2.$$

This is equivalent to performing cumulative multiplication on 40 third squared spectral coefficients. Square root calculation (equivalent to extraction of a $40^{th}$ root) is performed on the first product result based on a quantity of spectral line sequence numbers to obtain a geometric mean nume(1) corresponding to the third spectral line combination.

In some embodiments, the obtaining the arithmetic mean of the third spectral line combination may be implemented by using the following technical solution: extracting a spectral coefficient corresponding to each spectral line sequence number of the third spectral line combination from the high-frequency spectrum; squaring the spectral coefficient of each spectral line sequence number to obtain a third squared spectral coefficient of each spectral line sequence number; in a case that the third spectral line combination includes a plurality of spectral line sequence numbers, summing third squared spectral coefficients of the plurality of spectral line sequence numbers to obtain a third summation result; and averaging the third summation result based on a quantity of spectral line sequence numbers to obtain the arithmetic mean corresponding to the third spectral line combination.

In an example, for a calculation process for the geometric mean, refer to a formula (5):

$$demo(i) = \frac{1}{\text{table}(i+1) - \text{table}(i)} \sum_{table(i)}^{table(i+1)} m_k^2 \quad (5)$$

With reference to the foregoing example, for the third spectral line combination with a sequence number of 1 (i is 1), a spectral coefficient corresponding to each spectral line sequence number of the third spectral line combination A is extracted from the high-frequency spectrum. To be specific, a spectral coefficient $m_0$ of a spectrum with a spectral line sequence number of 0 to a spectral coefficient $m_{39}$ of a spectrum with a spectral line sequence number of 39 are extracted. The spectral coefficient for each spectral line sequence number is squared to obtain a third squared spectral coefficient $$m_k^2$$

for each spectral line sequence number, for example, $$m_0^2$$

and $$m_1^2.$$

In a case that the third spectral line combination includes a plurality of spectral line sequence numbers, third squared spectral coefficients of the plurality of spectral line sequence numbers are summed to obtain a third summation result $$\sum_{table(i)}^{table(i+1)} m_k^2.$$

This is equivalent to summing 40 third squared spectral coefficients. The third summation result is averaged (to be specific, divided by 40) based on a quantity of spectral line sequence numbers to obtain an arithmetic mean demo(1) corresponding to the third spectral line combination.

In step 105, quantization encoding is performed on the spectral flatness information of the high-frequency spectrum and the spectral envelope information of the audio signal to obtain a bandwidth extension bitstream of the audio signal, and the bandwidth extension bitstream and the bitstream of the low-frequency signal are combined into an encoded bitstream of the audio signal.

In some embodiments, the performing quantization encoding on the spectral flatness information of the high-frequency spectrum and the spectral envelope information of the audio signal to obtain the bandwidth extension bitstream of the audio signal in step 105 may be implemented by using the following technical solution: obtaining a quantization table of the spectral flatness information and a quantization table of the spectral envelope information; quantizing the spectral flatness information of the high-frequency spectrum based on the quantization table of the spectral flatness information to obtain a spectral flatness quantization result; quantizing the spectral envelope information of the audio signal based on the quantization table of the spectral envelope information to obtain a spectral envelope quantization result; and combining the spectral flatness quantization result and the spectral envelope quantization result into the bandwidth extension bitstream of the audio signal.

In some embodiments, the obtaining the quantization table of the spectral flatness information and the quantization table of the spectral envelope information may be implemented by using the following technical solution: obtaining a plurality of speech sample signals, and performing the following processing on each speech sample signal; filtering the speech sample signal to obtain a low-frequency sample signal and a high-frequency sample signal of the speech sample signal, a frequency of the low-frequency sample signal being lower than that of the high-frequency sample signal; performing frequency domain transform on the low-frequency sample signal to obtain a low-frequency sample spectrum, and performing frequency domain transform on the high-frequency sample signal to obtain a high-frequency sample spectrum; performing spectral envelope extraction on the low-frequency sample spectrum and the high-frequency sample spectrum to obtain spectral envelope information of the speech sample signal, and performing spectral flatness extraction on the high-frequency spectrum to obtain spectral flatness information of the speech sample signal; clustering spectral flatness information of the plurality of speech sample signals to obtain a plurality of spectral flatness clustering centers, and constructing the quantization table of the spectral flatness information based on the plurality of spectral flatness clustering centers; and clustering spectral envelope information of the plurality of speech sample signals to obtain a plurality of spectral envelope clustering centers, and constructing the quantization table of the spectral envelope information based on the plurality of spectral envelope clustering centers.

In an example, after the plurality of speech sample signals are obtained, for a process of filtering the speech sample signal until the spectral envelope information and the spectral flatness information of the speech sample signal are obtained, refer to the specific implementation of step 104.

In an example, the quantization table used for quantizing the spectral flatness information is shown in Table 4. Table 4 shows each spectral flatness clustering center. The process is equivalent to obtaining four clustering centers through clustering, and quantizing spectral flatness information A into a clustering center with a smallest difference from A among the four clustering centers during subsequent quantization.

TABLE 4

| Spectral flatness information quantization table<br>Spectral flatness quantization result |
|---|
| 0.143924057483673 |
| 0.235843583941460 |
| 0.315315455198288 |
| 0.423458933830261 |

In an example, a quantization table used for the spectral envelope information of the high-frequency part is shown in Table 5. Table 5 shows spectral envelope clustering centers obtained through clustering based on a first subband and a second subband in the high-frequency part of the sample data. The process is equivalent to obtaining 31 clustering centers through clustering, and quantizing spectral envelope information A of the first subband and the second subband in the high-frequency part into a clustering center with a smallest difference from A among the 31 clustering centers during subsequent quantization.

TABLE 5

| Spectral envelope quantization table (first subband and second subband) | | | | | | | | | | |
|---|---|---|---|---|---|---|---|---|---|---|
| −5.8 | −3.1 | −2.8 | −2.6 | −2.35 | −2.1 | −1.85 | −1.6 | −1.35 | −1.1 | −0.85 |
| −0.6 | −0.35 | −0.1 | 0.15 | 0.4 | 0.65 | 0.9 | 1.15 | 1.4 | 1.65 | 1.9 |
| 2.15 | 2.4 | 2.65 | 2.9 | 3.15 | 3.4 | 3.65 | 3.9 | 4.15 | 4.4 | |

In an example, a quantization table used for the spectral envelope information of the high-frequency part is alternatively shown in Table 6. Table 6 shows spectral envelope clustering centers obtained through clustering based on a third subband and a fourth subband in the high-frequency part of the sample data. The process is equivalent to obtaining eight clustering centers through clustering, and quantizing spectral envelope information A of the third subband and the fourth subband in the high-frequency part into a clustering center with a smallest difference from A among the eight clustering centers during subsequent quantization.

TABLE 6

| Spectral envelope quantization table (third subband and fourth subband)<br>Spectral envelope quantization result |
|---|
| −5.8 |
| −3 |
| −1.5 |
| 0 |
| 1 |
| 2 |
| 3 |
| 4 |

In an example, a spectral envelope quantization table for the low-frequency part is shown in Table 7. Table 7 shows spectral envelope clustering centers obtained through clustering based on the low-frequency part of the sample data. The process is equivalent to obtaining eight clustering centers through clustering, and quantizing spectral envelope information A of the low-frequency part into a clustering center with a smallest difference from A among the eight clustering centers during subsequent quantization.

TABLE 7

| Spectral envelope quantization table<br>Spectral envelope quantization result |
|---|
| −5.3 |
| −3.9 |
| −1.2 |
| 0.7 |
| 2.1 |
| 3.5 |
| 4.4 |
| 5.4 |

The generation processes in Table 4 to Table 7 are obtained through statistical experiments. Clustering calculation is performed on a large number of audio files according to the foregoing processes to finally obtain a statistical distribution based on a large number of audio distributions. The statistical distribution is clustered and quantized based on both a bitrate and audio quality to finally generate Table 4 to Table 7.

The spectral flatness information and the spectral envelope can be effectively compressed and represented through quantization encoding, to reduce an amount of data of the spectral flatness information and the spectral envelope information, avoid occupying excessive communication resources, and effectively improve communication efficiency.

In the audio processing method provided in embodiments of the present disclosure, the spectral envelope information and the spectral flatness information of the high-frequency part can be jointly and effectively encoded with a lower bitrate than that in the related art, to effectively characterize the high-frequency part with low complexity, so that a more real and natural audio signal can be restored during subsequent decoding. Particularly, in a case that an encoder is an encoder based on a neural network model, an error in a result obtained after neural network modeling, encoding, and transmission of a low-frequency signal is significantly different from an error in a result obtained by a non-AI-based audio codec, and a decoding result has a larger error. To be specific, an error caused by inaccurate encoding or decoding of a high-frequency signal is more significant. In a case that a bandwidth extension solution in the related art is used, a high-frequency part reconstructed on a decoder side has significant noise. In a case that the audio processing method provided in embodiments of the present disclosure is used, an accurate high-frequency part can be reconstructed, to restore a more real and natural audio signal.

Figure 3B:
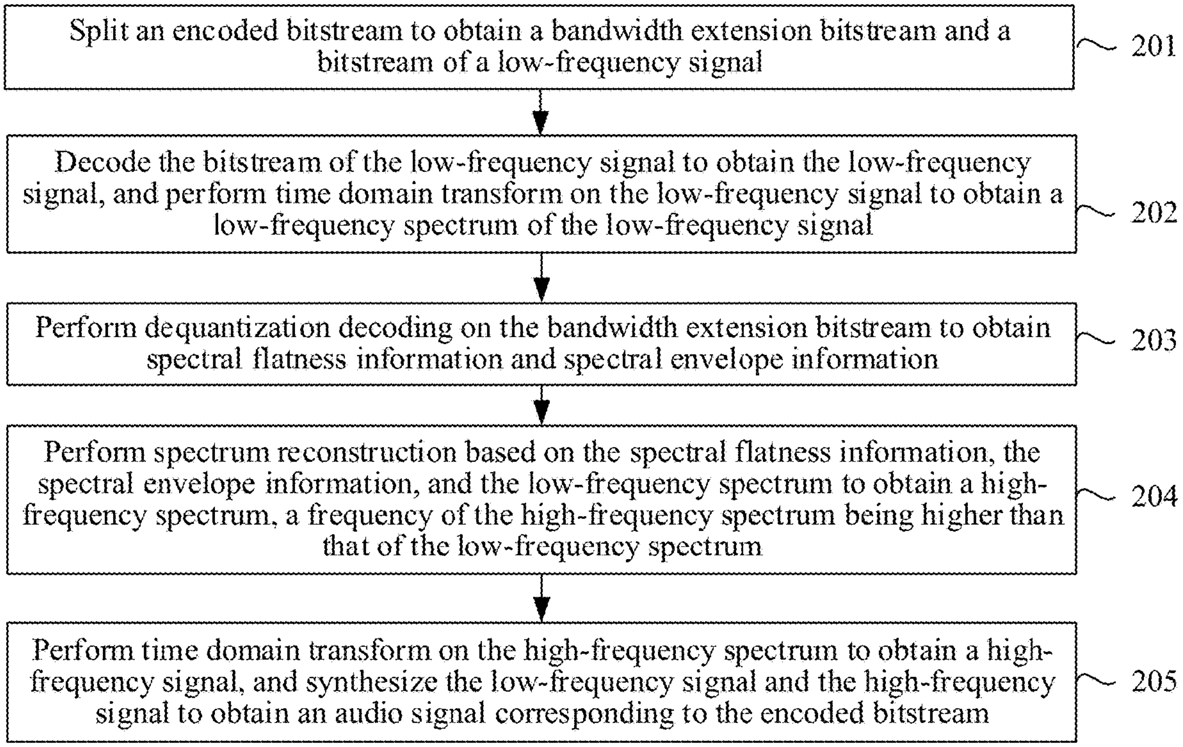

FIG. 3B is a schematic flowchart of an audio processing method according to an embodiment of the present disclosure. The method is described with reference to steps shown in FIG. 3B.

In step 201, an encoded bitstream is split to obtain a bandwidth extension bitstream and a bitstream of a low-frequency signal.

Figure 8:
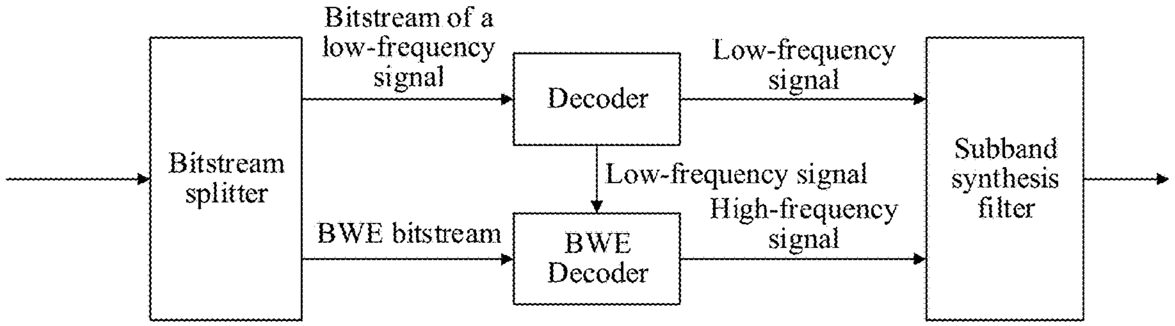
FIG. 8 is a schematic diagram of decoding of an audio processing method according to an embodiment of the present disclosure.

For example, refer to FIG. 8. FIG. 8 is a schematic diagram of decoding of an audio processing method according to an embodiment of the present disclosure. A decoder side splits a received encoded bitstream into a BWE bitstream and a bitstream of a low-frequency signal. The bitstream of the low-frequency signal is processed by an AI-based ultra-wideband speech decoder to restore the low-frequency signal. The low-frequency signal and the BWE bitstream are processed by a BWE decoder provided in embodiments of the present disclosure to restore a high-frequency bitstream. The high-frequency bitstream is transformed into a high-frequency signal through time domain transform. The high-frequency signal and the low-frequency signal are processed by synthesis filters to generate an ultra-wideband signal.

In step 202, the bitstream of the low-frequency signal is decoded to obtain the low-frequency signal, and frequency domain transform is performed on the low-frequency signal to obtain a low-frequency spectrum of the low-frequency signal.

Figure 5:
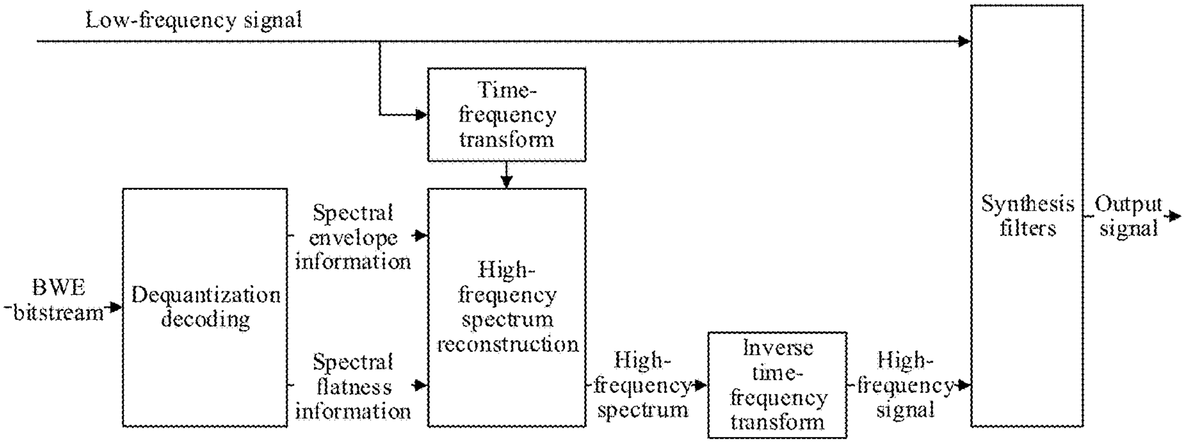
FIG. 5 is a schematic diagram of bandwidth extension decoding of an audio processing method according to an embodiment of the present disclosure.

For example, refer to FIG. 5. FIG. 5 is a schematic diagram of bandwidth extension decoding of an audio processing method according to an embodiment of the present disclosure. A low-frequency signal in FIG. 5 is a low-frequency signal obtained through decoding. Frequency domain transform is performed on the low-frequency signal obtained through decoding to obtain a low-frequency spectrum of the low-frequency signal. The frequency domain transform may be MDCT or DCT.

In step 203, the bandwidth extension bitstream is dequantized to obtain spectral flatness information and spectral envelope information.

Because the bandwidth extension bitstream is obtained through quantization encoding on the spectral flatness information and the spectral envelope information, the spectral flatness information and spectral envelope information may be obtained through dequantization decoding.

In step 204, high-frequency spectrum reconstruction is performed based on the spectral flatness information, the spectral envelope information, and the low-frequency spectrum to obtain a high-frequency spectrum.

Figure 3C:
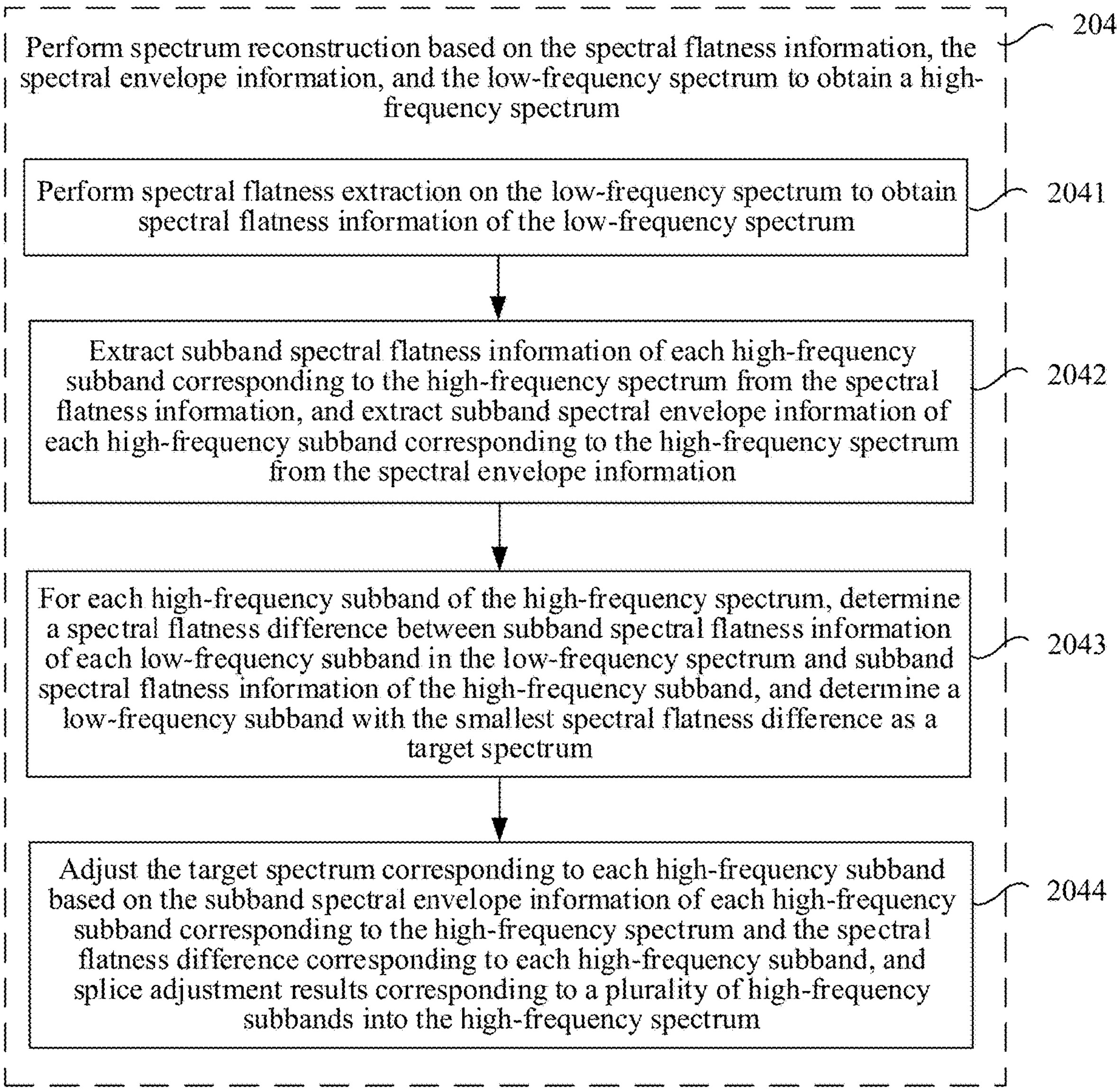

In some embodiments, refer to FIG. 3C. FIG. 3C is a schematic flowchart of an audio processing method according to an embodiment of the present disclosure. The performing high-frequency spectrum reconstruction based on the spectral flatness information, the spectral envelope information, and the low-frequency spectrum to obtain the high-frequency spectrum in step 204 may be implemented in step 2041 to step 2044 shown in FIG. 3C.

In step 2041, spectral flatness extraction is performed on the low-frequency spectrum to obtain low-frequency spectral flatness information of the low-frequency spectrum, and subband spectral flatness information of each low-frequency subband is extracted from the low-frequency spectral flatness information.

In some embodiments, the performing spectral flatness extraction on the low-frequency spectrum to obtain the low-frequency spectral flatness information of the low-frequency spectrum in step 2041 may be implemented by using the following technical solution: obtaining fourth fusion configuration data of the low-frequency spectrum, the fourth fusion configuration data including a spectral line sequence number of each fourth spectral line combination; and performing the following processing on each fourth spectral line combination: obtaining a geometric mean of the fourth spectral line combination, and obtaining an arithmetic mean of the fourth spectral line combination; using a ratio of the geometric mean of the low-frequency spectrum to the arithmetic mean of the low-frequency spectrum as spectral flatness information of the fourth spectral line combination; and generating the low-frequency spectral flatness information of the low-frequency spectrum based on spectral flatness information of at least one fourth spectral line combination.

In some embodiments, the obtaining the geometric mean of the fourth spectral line combination may be implemented by using the following technical solution: extracting a spectral coefficient corresponding to each spectral line sequence number of the fourth spectral line combination from the low-frequency spectrum; squaring the spectral coefficient of each spectral line sequence number to obtain a fourth squared spectral coefficient of each spectral line sequence number; in a case that the fourth spectral line combination includes a plurality of spectral line sequence numbers, performing product processing on fourth squared spectral coefficients of the plurality of spectral line sequence numbers to obtain a second product result; and performing square root calculation on the second product result based on a quantity of spectral line sequence numbers to obtain the geometric mean corresponding to the fourth spectral line combination.

In some embodiments, the obtaining the arithmetic mean of the fourth spectral line combination may be implemented by using the following technical solution: extracting a spectral coefficient corresponding to each spectral line sequence number of the fourth spectral line combination from the low-frequency spectrum; squaring the spectral coefficient of each spectral line sequence number to obtain a fourth squared spectral coefficient of each spectral line sequence number; in a case that the fourth spectral line combination includes a plurality of spectral line sequence numbers, summing fourth squared spectral coefficients of the plurality of spectral line sequence numbers to obtain a fourth summation result; and averaging the fourth summation result based on a quantity of spectral line sequence numbers to obtain the arithmetic mean corresponding to the fourth spectral line combination.

For an implementation of determining the low-frequency spectral flatness information of the low-frequency spectrum in step 2041, refer to the implementation of extracting the spectral flatness information of the high-frequency spectrum in step 104. A difference lies only in that a processed object changes from the high-frequency spectrum to the low-frequency spectrum. Therefore, the fourth spectral line combination used is different from the third spectral line combination.

In step 2042, subband spectral flatness information of each high-frequency subband corresponding to the high-frequency spectrum is extracted from the spectral flatness information, and subband spectral envelope information of each high-frequency subband corresponding to the high-frequency spectrum is extracted from the spectral envelope information.

In step 2043, for each high-frequency subband of the high-frequency spectrum, a spectral flatness difference between subband spectral flatness information of each low-frequency subband in the low-frequency spectrum and subband spectral flatness information of the high-frequency subband is determined, and a low-frequency subband with the smallest spectral flatness difference is determined as a target spectrum.

In step 2044, amplitude adjustment is performed on the target spectrum corresponding to each high-frequency subband based on the subband spectral envelope information of each high-frequency subband corresponding to the high-frequency spectrum and the spectral flatness difference corresponding to each high-frequency subband, and adjustment results corresponding to a plurality of high-frequency subbands are spliced into the high-frequency spectrum.

In some embodiments, the performing amplitude adjustment on the target spectrum corresponding to each high-frequency subband based on the subband spectral envelope information of each high-frequency subband corresponding to the high-frequency spectrum and the spectral flatness difference corresponding to each high-frequency subband in step 2044 may be implemented by using the following technical solution: performing the following processing on the target spectrum corresponding to each high-frequency subband: determining white noise matching the spectral flatness difference of the high-frequency subband, and adding the matching white noise to the target spectrum to obtain a composite target spectrum; determining spectral envelope information of the composite target spectrum, and determining a spectral envelope difference between the spectral envelope information of the composite target spectrum and the spectral envelope information of the high-frequency subband; and adjusting an amplitude of the composite target spectrum based on the spectral envelope difference.

Figure 6:
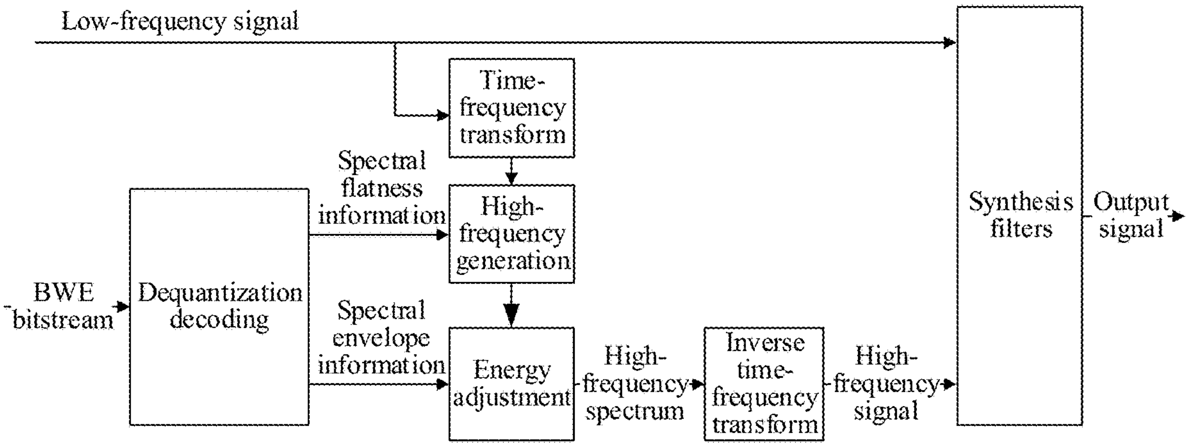
FIG. 6 is a schematic diagram of bandwidth extension decoding of an audio processing method according to an embodiment of the present disclosure.

In an example, a specific restoration process may be shown in FIG. 6. First, spectral flatness analysis and calculation is performed on a low-frequency spectrum to obtain spectral flatness of a low-frequency part. For a calculation process, refer to formulas (7) to (9). Then a low-frequency part closest to each high-frequency subband is selected as a target spectrum based on spectral flatness information of a high-frequency part. Then energy of the target spectrum is fine-adjusted based on spectral envelope information and a difference between spectral flatness information. Finally, a plurality of subbands of the high-frequency part are spliced into a complete high-frequency spectrum. A complete high-frequency spectrum is obtained through adjustment by a tilt filter. Inverse time-frequency transform of MDCT is performed on the high-frequency spectrum to obtain a high-frequency signal. The restored high-frequency signal and a low-frequency signal obtained by a decoder through decoding are inputted to quadrature mirror filters for synthesis filtering to obtain an ultra-wideband speech signal.

In the audio processing method provided in embodiments of the present disclosure, joint processing is performed based on a spectrum and spectral envelope information of a low-frequency signal and spectral flatness information of a high-frequency part that are restored on a decoder side to reconstruct a high-frequency spectrum. In addition, error control is performed on the decoder side to prevent an encoding error of a speech encoder (especially an ultra-low-bitrate speech encoder based on NN modeling) in a low-frequency part from spreading in a high-frequency part, so that quality of decoded audio is greatly improved.

In step 205, time domain transform is performed on the high-frequency spectrum to obtain a high-frequency signal, and the low-frequency signal and the high-frequency signal are synthesized to obtain an audio signal corresponding to the encoded bitstream.

In an example, inverse time-frequency transform of MDCT is performed on the high-frequency spectrum to obtain a high-frequency signal. The restored high-frequency signal and a low-frequency signal obtained by a decoder through decoding are inputted to quadrature mirror filters for synthesis filtering to obtain an audio signal.

Figure 3D:
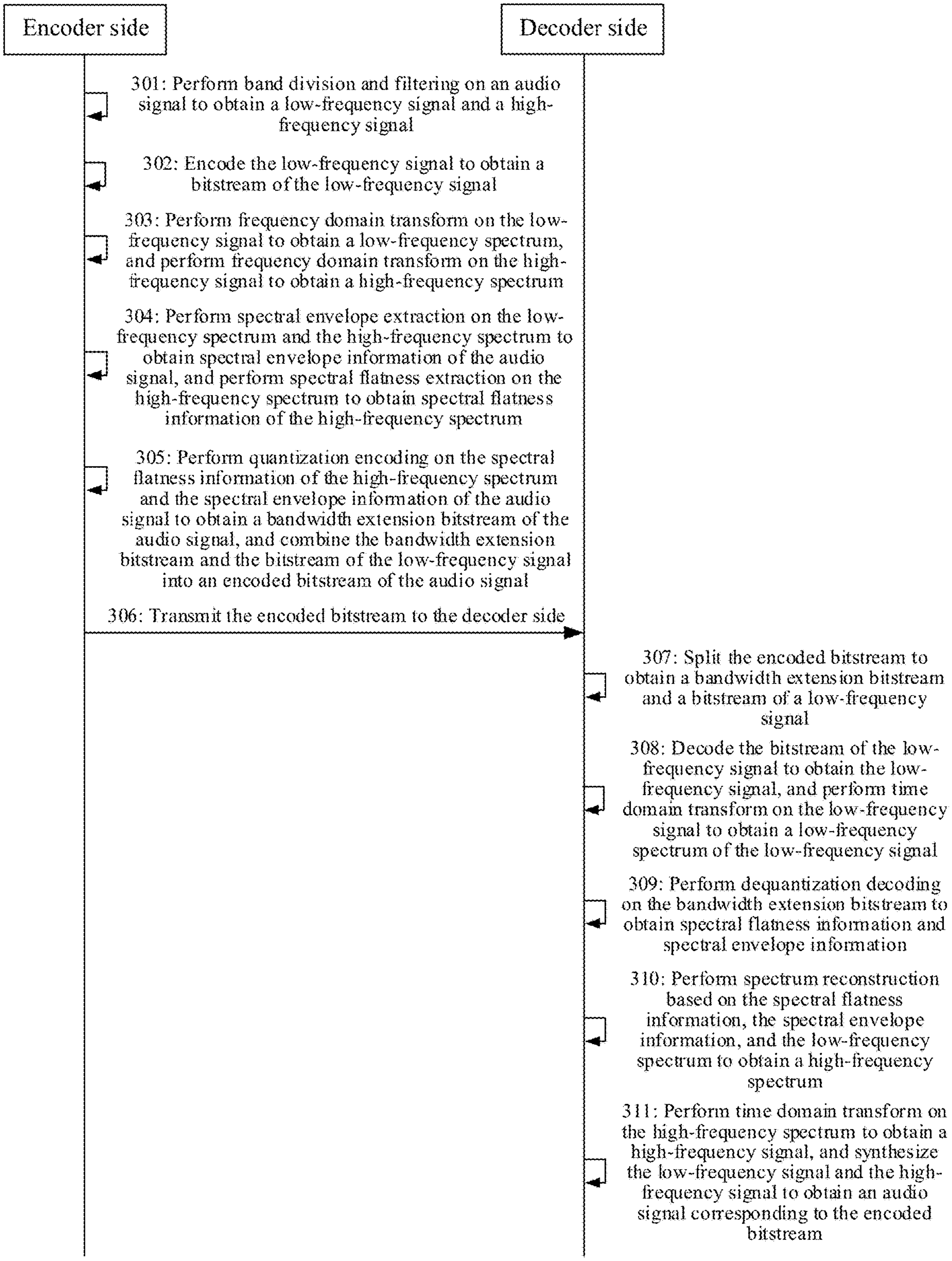

FIG. 3D is a schematic flowchart of an audio processing method according to an embodiment of the present disclosure. FIG. 3D shows a complete encoding and decoding process.

In step 301, an encoder side filters an audio signal to obtain a low-frequency signal and a high-frequency signal.

In step 302, the encoder side encodes the low-frequency signal to obtain a bitstream of the low-frequency signal.

In step 303, the encoder side performs frequency domain transform on the low-frequency signal to obtain a low-frequency spectrum, and performs frequency domain transform on the high-frequency signal to obtain a high-frequency spectrum.

In step 304, the encoder side performs spectral envelope extraction on the low-frequency spectrum and the high-frequency spectrum to obtain spectral envelope information of the audio signal, and performs spectral flatness extraction on the high-frequency spectrum to obtain spectral flatness information of the high-frequency spectrum.

In step 305, the encoder side performs quantization encoding on the spectral flatness information of the high-frequency spectrum and the spectral envelope information of the audio signal to obtain a bandwidth extension bitstream of the audio signal, and combines the bandwidth extension bitstream and the bitstream of the low-frequency signal into an encoded bitstream of the audio signal.

In step 306, the encoder side transmits the encoded bitstream to a decoder side.

In step 307, the decoder side splits the encoded bitstream to obtain a bandwidth extension bitstream and a bitstream of a low-frequency signal.

In step 308, the decoder side decodes the bitstream of the low-frequency signal to obtain the low-frequency signal, and performs frequency domain transform on the low-frequency signal to obtain a low-frequency spectrum of the low-frequency signal.

In step 309, the decoder side dequantizes the bandwidth extension bitstream to obtain spectral flatness information and spectral envelope information.

In step 310, the decoder side performs high-frequency spectrum reconstruction based on the spectral flatness information, the spectral envelope information, and the low-frequency spectrum to obtain a high-frequency spectrum.

In step 311, the decoder side performs time domain transform on the high-frequency spectrum to obtain a high-frequency signal, and synthesizes the low-frequency signal and the high-frequency signal to obtain an audio signal corresponding to the encoded bitstream.

An audio signal is filtered to obtain a low-frequency signal with a low frequency and a high-frequency signal with a high frequency, and the low-frequency signal is encoded to obtain a bitstream of the low-frequency signal. Spectral envelope information of the audio signal and spectral flatness information of the high-frequency signal are extracted from a low-frequency spectrum of the low-frequency signal and a high-frequency spectrum of the high-frequency signal. Quantization encoding is performed on the spectral flatness information and the spectral envelope information to obtain a bandwidth extension bitstream of the audio signal, and the bandwidth extension bitstream of the audio signal is combined with the bitstream of the low-frequency signal into an encoded bitstream of the audio signal. The high-frequency signal can be effectively encoded based on the spectral envelope information and the spectral flatness information, to improve code integrity of the high-frequency part. Joint processing is performed based on a spectrum and spectral envelope information of a low-frequency signal and spectral flatness information of a high-frequency part that are restored on a decoder side to reconstruct a high-frequency spectrum, to improve quality of audio obtained through subsequent decoding.

The following describes exemplary application of embodiments of the present disclosure in a real application scenario.

In some embodiments, a client runs on a first terminal, and the client may be various types of clients, for example, an instant messaging client, a web conferencing client, a livestreaming client, or a browser. In response to an audio capture instruction triggered by a sender (for example, an initiator of a network conference, an anchor, or an initiator of a voice call), the client calls a microphone of the first terminal to capture an audio signal, and filters the captured audio signal to obtain a low-frequency signal and a high-frequency signal, where a frequency of the low-frequency signal is lower than that of the high-frequency signal; encodes the low-frequency signal to obtain a bitstream of the low-frequency signal; performs frequency domain transform on the low-frequency signal to obtain a low-frequency spectrum, and performs frequency domain transform on the high-frequency signal to obtain a high-frequency spectrum; performs spectral envelope extraction on the low-frequency spectrum and the high-frequency spectrum to obtain spectral envelope information of the audio signal, and performs spectral flatness extraction on the high-frequency spectrum to obtain spectral flatness information of the high-frequency spectrum; and performs quantization encoding on the spectral flatness information of the high-frequency spectrum and the spectral envelope information of the audio signal to obtain a bandwidth extension bitstream of the audio signal, and combines the bandwidth extension bitstream and the bitstream of the low-frequency signal into an encoded bitstream of the audio signal. Then the client may transmit the encoded bitstream to a server through a network, so that the server transmits the bitstream to a second terminal associated with a recipient (for example, a participant of the network conference, an audience, or a recipient of the voice call). After receiving the encoded bitstream transmitted by the server, a client (for example, an instant messaging client, a web conferencing client, a livestreaming client, or a browser) splits the encoded bitstream to obtain the bandwidth extension bitstream and the bitstream of the low-frequency signal; decodes the bitstream of the low-frequency signal to obtain the low-frequency signal, and performs frequency domain transform on the low-frequency signal to obtain a low-frequency spectrum of the low-frequency signal; dequantizes the bandwidth extension bitstream to obtain spectral flatness information and spectral envelope information; performs high-frequency spectrum reconstruction based on the spectral flatness information, the spectral envelope information, and the low-frequency spectrum to obtain a high-frequency spectrum, a frequency of the high-frequency spectrum being higher than that of the low-frequency spectrum; and performs time domain transform on the high-frequency spectrum to obtain a high-frequency signal, and synthesizes the low-frequency signal and the high-frequency signal to obtain an audio signal corresponding to the encoded bitstream.

Embodiments of the present disclosure provide an audio processing method. When an encoder side encodes and compresses a low-frequency part of an audio signal to obtain a bitstream of a low-frequency signal, a bandwidth extension solution based on spectral flatness information is performed, to implement encoding and transmission of ultra-wideband speech at a very low bitrate.

Figure 4:
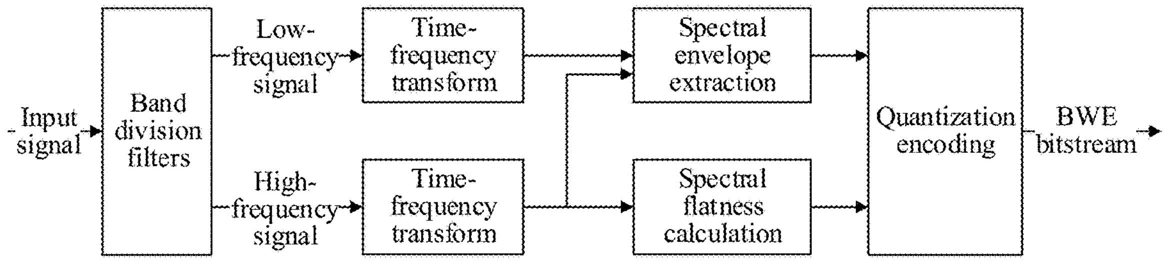
FIG. 4 is a schematic diagram of bandwidth extension encoding of an audio processing method according to an embodiment of the present disclosure.

FIG. 4 is a schematic diagram of bandwidth extension encoding of an audio processing method according to an embodiment of the present disclosure. An input signal is an ultra-wideband signal with a sampling rate of 32 kHz. The sampling rate of 32 kHz indicates that 32,000 sampling points are obtained through 32,000 times of sampling per second. The input signal is divided into frames based on a frame length of 640 points. To be specific, the audio signal is divided into frames by using 640 sampling points as one frame. A frame length of each frame is 640 points, and duration of each frame is 0.02 seconds. A high-frequency part of the signal that has a frame length of 320 points and a low-frequency part with a frame length of 320 points are obtained through processing by QMF band division filters. The high-frequency part and the low-frequency part are referred to as a high-frequency signal and a low-frequency signal below respectively.

MDCT time-frequency transform is performed on the high-frequency signal and the low-frequency signal based on a frame length of 320 sampling points and a frame shift of 160 sampling points to obtain a corresponding high-frequency spectrum and a corresponding low-frequency spectrum respectively. The frame shift of 160 sampling points represents that a time difference between starting positions of two adjacent frames is an time interval corresponding to 160 sampling points.

The low-frequency spectrum and the high-frequency spectrum each are fused based on a corresponding spectral envelope fusion table to extract spectral envelope information. A formula for extracting the spectral envelope information is shown in a formula (6):

$$\text{Spec\_env}(i) = 0.5 * \log_2\left(\sum_{k=table(i)}^{table(i+1)} m_k^2\right) \tag{6}$$

$m_k$ represents a $k^{th}$ spectral coefficient of an MDCT transform result, and i represents a spectral envelope sequence number. For example, in a case that i is 1, each of m0, $m_1$, . . . , and $m_{19}$ are squared, and squared results are summed.

Spectral envelope fusion tables used for the high-frequency part and the low-frequency part in embodiments of the present disclosure are shown in Table 8 and Table 9 respectively.

First, description is provided with reference to Table 8. Table 8 indicates that four sets of fusion are performed on the MDCT transform result. The $0^{th}$ spectral coefficient to the $19^{th}$ spectral coefficient of the MDCT transform result are fused based on the formula (6). This is equivalent to fusion of the $0^{th}$ spectral line to the $19^{th}$ spectral line. The $20^{th}$ spectral coefficient to the $54^{th}$ spectral coefficient of the MDCT transform result are fused based on the formula (6). The $55^{th}$ spectral coefficient to the $89^{th}$ spectral coefficient of the MDCT transform result are fused based on the formula (6). The $90^{th}$ spectral coefficient to the $130^{th}$ spectral coefficient of the MDCT transform result are fused based on the formula (6).

TABLE 8

Spectral envelope fusion table for the high-frequency part

| Spectral envelope sequence number | Sequence number of a spectral coefficient |
|---|---|
| 1 | 0 |
| 2 | 20 |
| 3 | 55 |
| 4 | 90 |
| | 130 |

The spectral envelope fusion table 8 for the high-frequency part is obtained by comprehensively considering BWE quality and a bitrate in a specific experiment with a critical band in a psychoacoustic model as a theoretical basis. The critical band is a result obtained based on psychoacoustic experiments, and specifically indicates conversion between physical mechanical stimulation and neural electrical stimulation at a cochlea of a human ear. For a pure-tone audio signal with a specific frequency or a pure-tone audio signal with a specific frequency with another frequency within a specific range near a human ear, neural electrical stimulation obtained through conversion by the human ear remains consistent. This means that no excessively high bitrate needs to be used to achieve an excessively high resolution in frequency domain. Based on a plurality of experiments and tests, a bitrate and BWE quality are used as evaluation indicators for experiment results to obtain data shown in Table 8.

Then description is provided with reference to Table 9. Table 9 indicates that one set of fusion is performed on the MDCT transform result, and the $80^{th}$ spectral coefficient to the $150^{th}$ spectral coefficient of the MDCT transform result are fused based on the formula (6).

TABLE 9

Envelope fusion table for the low-frequency part

| Spectral envelope sequence number | Sequence number of a spectral coefficient |
|---|---|
| 1 | 80 |
| | 150 |

The spectral envelope fusion table 9 for the low-frequency part is also obtained through experimental statistical tests. In a case that the low-frequency part is encoded through AI-based ultra-wideband speech encoding, because the AI-based ultra-wideband speech encoding has a strong speech modeling capability and a noise reduction capability, a variable needs to be introduced to measure and estimate noise reduction effect. An energy envelope of the low-frequency part may be used as a variable for estimation. It is found through statistical tests with large-scale data sets that, in a case that an energy envelope selection range for the low-frequency part is the data shown in Table 9, an accurate and stable estimated value can be obtained, and complexity and a bitrate are acceptable. The data shown in Table 9 is selected as a spectral envelope fusion table for the low-frequency part based on a comprehensive consideration of calculation accuracy, stability, complexity, a bitrate, and other factors.

The high-frequency spectrum is fused based on a corresponding spectral flatness fusion table to extract spectral flatness information. For calculation of extracting the spectral flatness information, refer to a formula (7) to a formula (9):

$$\text{nume}(i) = \sqrt[table(i+1)-table(i)]{\prod_{k=table(i)}^{table(i+1)} m_k^2} \tag{7}$$

$$\text{demo}(i) = \frac{1}{\text{table}(i+1) - \text{table}(i)} \sum_{table(i)}^{table(i+1)} m_k^2 \tag{8}$$

$$\text{Flatness}(i) = \frac{\text{nume}(i)}{\text{deno}(i)} \tag{9}$$

$m_k$ represents a $k^{th}$ spectral coefficient of the MDCT transform result. nume(i) and demo(i) respectively represent a geometric mean and an arithmetic mean of each spectral line in the MDCT transform result. The spectral flatness information Flatness(i) is a ratio of the geometric mean to the arithmetic mean. The spectral flatness information indicates whether audio corresponding to the spectrum is closer to white noise or closer to a pure-tone signal at a single frequency. i represents a sequence number of the spectral flatness information. In a case that i is 1, each of $m_0$, $m_1$, . . . , and $m_{39}$ is squared, and the spectral flatness information is determined based on squared results.

The spectral flatness information of the high-frequency spectrum is extracted based on a spectral flatness fusion table for the high-frequency part, as shown in Table 10.

TABLE 10

Spectral flatness fusion table for the high-frequency part

| Sequence number of spectral flatness | Sequence number of a spectral coefficient |
|---|---|
| 1 | 0 |
| 2 | 40 |
| | 80 |

The spectral flatness fusion table 10 for the high-frequency part is obtained by comprehensively considering BWE quality and a bitrate in a specific experiment with a critical band in a psychoacoustic model as a theoretical basis. The critical band is a result obtained based on psychoacoustic experiments, and specifically indicates conversion between physical mechanical stimulation and neural electrical stimulation at a cochlea of a human ear. For a pure-tone audio signal with a specific frequency or a pure-tone audio signal with a specific frequency with another frequency within a specific range near a human ear, neural electrical stimulation obtained through conversion by the human ear remains consistent. This means that no excessively high bitrate needs to be used to achieve an excessively high resolution in frequency domain. Based on a plurality of experiments and tests, a bitrate and BWE quality are used as evaluation indicators for experiment results to obtain data shown in Table 10.

Quantization encoding is performed on the spectral envelope information and the spectral flatness information based on corresponding quantization tables respectively to form a BWE bitstream. A quantization table used for quantizing the spectral flatness information is shown in Table 11.

TABLE 11

| Spectral flatness information quantization table<br>Spectral flatness quantization result |
|---|
| 0.143924057483673 |
| 0.235843583941460 |
| 0.315315455198288 |
| 0.423458933830261 |

The generation process in Table 11 is obtained through statistical experiments. Spectral flatness is calculated based on a large number of audio files according to the foregoing process to finally obtain a statistical distribution based on a large number of audio distributions. The statistical distribution is clustered and quantized based on both a bitrate and audio quality to finally generate Table 11. A spectral envelope quantization table 12 for a first subband and a second subband of the high-frequency part, a spectral envelope quantization table 13 for a third subband and a fourth subband of the high-frequency part, and a spectral envelope quantization table 14 for the low-frequency part are generated in a manner similar to that of Table 11. Specific results of all the quantization tables are related to statistical experiments, and dimensionality of the quantization tables may be flexibly adjusted based on specific application scenarios.

The spectral envelope quantization table for the first subband and the second subband of the high-frequency part is shown in Table 12.

TABLE 12

| Spectral envelope quantization table (first subband and second subband) | | | | | | | | | | |
|---|---|---|---|---|---|---|---|---|---|---|
| −5.8 | −3.1 | −2.8 | −2.6 | −2.35 | −2.1 | −1.85 | −1.6 | −1.35 | −1.1 | −0.85 |
| −0.6 | −0.35 | −0.1 | 0.15 | 0.4 | 0.65 | 0.9 | 1.15 | 1.4 | 1.65 | 1.9 |
| 2.15 | 2.4 | 2.65 | 2.9 | 3.15 | 3.4 | 3.65 | 3.9 | 4.15 | 4.4 | |

The spectral envelope quantization table for the third subband and the fourth subband of the high-frequency part is shown in Table 13.

TABLE 13

| Spectral envelope quantization table (third subband and fourth subband)<br>Spectral envelope quantization result |
|---|
| −5.8 |
| −3 |
| −1.5 |
| 0 |
| 1 |
| 2 |
| 3 |
| 4 |

The spectral envelope quantization table for the low-frequency part is shown in Table 14.

TABLE 14

| Spectral envelope quantization table (low-frequency)<br>Spectral envelope quantization result |
|---|
| −5.3 |
| −3.9 |
| −1.2 |
| 0.7 |
| 2.1 |
| 3.5 |
| 4.4 |
| 5.4 |

FIG. 5 is a schematic diagram of bandwidth extension decoding of an audio processing method according to an embodiment of the present disclosure. A decoder side restores an ultra-wideband audio signal after receiving a BWE bitstream and a low-frequency signal. After the decoder side receives the BWE bitstream, the BWE bitstream is processed by a decoding module and a dequantization module to restore spectral envelope information and spectral flatness information. A low-frequency spectrum is obtained through MDCT time-frequency transform on a low-frequency time domain signal. A high-frequency spectrum is restored based on the low-frequency spectrum, the high-frequency spectral envelope information, and the high-frequency spectral flatness information. A specific restoration process may be shown in FIG. 6. The restoration process is as follows: First, flatness analysis and calculation is performed on a low-frequency spectrum to obtain spectral flatness of a low-frequency part. For a calculation process, refer to formulas (7) to (9). Then a low-frequency part closest to each high-frequency subband is selected as a target spectrum based on spectral flatness information of a high-frequency part. Then energy of the target spectrum is fine-adjusted based on spectral envelope information and a difference between spectral flatness information. Finally, a plurality of subbands of the high-frequency part are spliced into a complete high-frequency spectrum. A complete high-frequency spectrum is obtained through adjustment by a tilt filter. Inverse time-frequency transform of MDCT is performed on the high-frequency spectrum to obtain a high-frequency signal. The restored high-frequency signal and a low-frequency signal obtained by a decoder through decoding are inputted to quadrature mirror filters for synthesis filtering to obtain an ultra-wideband speech signal.

In the audio processing method provided in embodiments of the present disclosure, joint decision-making and adjustment are performed based on a spectrum of a low-frequency signal restored on a decoder side, original spectral envelope information included in BWE boundary information, and high-frequency spectral flatness information to reconstruct a high-frequency spectrum. This prevents an encoding error of an ultra-low-bitrate speech encoder (especially an ultra-low-bitrate speech encoder based on NN modeling) in a low-frequency part from spreading in a high-frequency part, so that quality of decoded audio is greatly improved.

Figure 7:
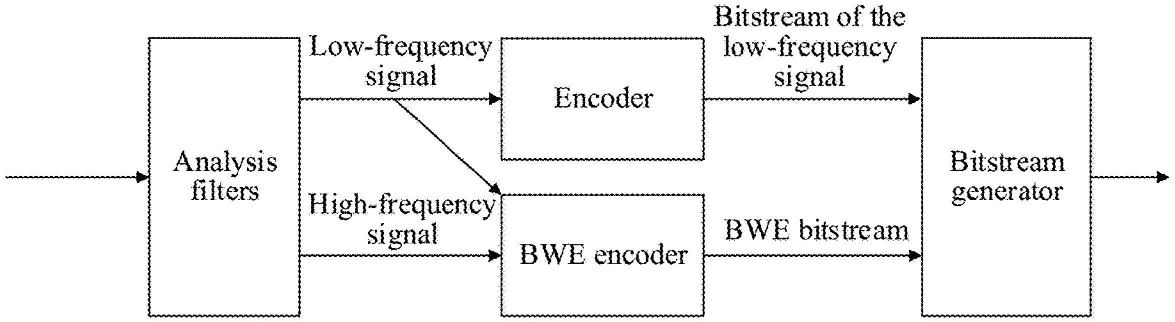
FIG. 7 is a schematic diagram of encoding of an audio processing method according to an embodiment of the present disclosure.

FIG. 7 is a schematic diagram of encoding of an audio processing method according to an embodiment of the present disclosure. On an encoder side, an ultra-wideband signal is processed by analysis filters to obtain a high-frequency part and a low-frequency part. An AI-based ultra-wideband speech encoder encodes the low-frequency part to obtain a bitstream of the low-frequency signal. Both the low-frequency part and the high-frequency part are used as input to a BWE encoder provided in embodiments of the present disclosure to generate a BWE bitstream, and the BWE bitstream and the low-frequency signal undergo final bitstream assembly together.

FIG. 8 is a schematic diagram of decoding of an audio processing method according to an embodiment of the present disclosure. A decoder side splits a received encoded bitstream into a BWE bitstream and a bitstream of a low-frequency signal. The bitstream of the low-frequency signal is processed by an AI-based ultra-wideband speech decoder to restore the low-frequency signal. The low-frequency signal and the BWE bitstream are processed by a BWE decoder provided in embodiments of the present disclosure to restore a high-frequency bitstream. The high-frequency bitstream is transformed into a high-frequency signal through time domain transform. The high-frequency signal and the low-frequency signal are processed by synthesis filters to generate an ultra-wideband signal.

The bandwidth extension technology in the audio processing method provided in embodiments of the present disclosure may be combined with an AI-based ultra-wideband speech encoder to encode ultra-wideband speech at a very low bitrate. In embodiments of the present disclosure, spectral flatness information and spectral envelope information are added as BWE boundary information, to extend a wideband signal for an AI-based ultra-wideband speech decoder to an ultra-wideband signal at very low complexity. In addition, an AI-based ultra-wideband speech encoder, a speech encoder based on NN modeling, is added to a decoder side to implement error control on low-frequency files. Compared with other bandwidth extension modes, this reduces impact of low-frequency quantization noise on a reconstructed high-frequency signal during bandwidth extension.

The following further describes an exemplary structure of the audio processing apparatus 455 provided in embodiments of the present disclosure when the apparatus is implemented as software modules. In some embodiments, as shown in FIG. 2A, software modules of the audio processing apparatus 455 stored in the memory 450 may include: a band division module 4551, configured to filter an audio signal to obtain a low-frequency signal and a high-frequency signal, a frequency of the low-frequency signal being lower than that of the high-frequency signal; an encoding module 4552, configured to encode the low-frequency signal to obtain a bitstream of the low-frequency signal; a frequency domain transform module 4553, configured to perform frequency domain transform on the low-frequency signal and the high-frequency signal respectively, to obtain a low-frequency spectrum and a high-frequency spectrum; an extraction module 4554, configured to perform spectral envelope extraction on the low-frequency spectrum and the high-frequency spectrum to obtain spectral envelope information of the audio signal, and perform spectral flatness extraction on the high-frequency spectrum to obtain spectral flatness information of the high-frequency spectrum; and a quantization module 4555, configured to perform quantization encoding on the spectral flatness information of the high-frequency spectrum and the spectral envelope information of the audio signal to obtain a bandwidth extension bitstream of the audio signal, and combine the bandwidth extension bitstream and the bitstream of the low-frequency signal into an encoded bitstream of the audio signal.

In some embodiments, the extraction module 4554 is further configured to: perform spectral envelope extraction on the low-frequency spectrum to obtain low-frequency spectral envelope information of the low-frequency spectrum; perform spectral envelope extraction on the high-frequency spectrum to obtain high-frequency spectral envelope information of the high-frequency spectrum; and combine the low-frequency spectral envelope information and the high-frequency spectral envelope information into the spectral envelope information of the audio signal.

In some embodiments, the extraction module 4554 is further configured to: obtain first fusion configuration data of the low-frequency spectrum, the first fusion configuration data including a spectral line sequence number of each first spectral line combination; and perform the following processing on each first spectral line combination: extracting a spectral coefficient corresponding to each spectral line sequence number of the first spectral line combination from the low-frequency spectrum; squaring the spectral coefficient of each spectral line sequence number to obtain a first squared spectral coefficient of each spectral line sequence number; in a case that the first spectral line combination includes a plurality of spectral line sequence numbers, summing first squared spectral coefficients of the plurality of spectral line sequence numbers to obtain a first summation result; performing logarithmic processing on the first summation result to obtain first fusion spectral envelope information corresponding to the first spectral line combination; and generating the low-frequency spectral envelope information based on first fusion spectral envelope information of at least one first spectral line combination.

In some embodiments, the extraction module 4554 is further configured to: obtain second fusion configuration data of the high-frequency spectrum, the second fusion configuration data including a spectral line sequence number of each second spectral line combination; and perform the following processing on each second spectral line combination: extracting a spectral coefficient corresponding to each spectral line sequence number of the second spectral line combination from the high-frequency spectrum; squaring the spectral coefficient of each spectral line sequence number to obtain a second squared spectral coefficient of each spectral line sequence number; in a case that the second spectral line combination includes a plurality of spectral line sequence numbers, summing second squared spectral coefficients of the plurality of spectral line sequence numbers to obtain a second summation result; performing logarithmic processing on the second summation result to obtain second fusion spectral envelope information corresponding to the second spectral line combination; and generating the high-frequency spectral envelope information based on second fusion spectral envelope information of at least one second spectral line combination.

In some embodiments, the extraction module 4554 is further configured to: obtain third fusion configuration data of the high-frequency spectrum, the third fusion configuration data including a spectral line sequence number of each third spectral line combination; and perform the following processing on each third spectral line combination: obtaining a geometric mean of the third spectral line combination, and obtaining an arithmetic mean of the third spectral line combination; using a ratio of the geometric mean of the third spectral line combination to the arithmetic mean of the third spectral line combination as spectral flatness information of the third spectral line combination; and generating the spectral flatness information of the high-frequency spectrum based on spectral flatness information of at least one third spectral line combination.

In some embodiments, the extraction module 4554 is further configured to: obtain third fusion configuration data of the high-frequency spectrum, the third fusion configuration data including a spectral line sequence number of each third spectral line combination; and perform the following processing on each third spectral line combination: extracting a spectral coefficient corresponding to each spectral line sequence number of the third spectral line combination from the high-frequency spectrum; squaring the spectral coefficient of each spectral line sequence number to obtain a third squared spectral coefficient of each spectral line sequence number; in a case that the third spectral line combination includes a plurality of spectral line sequence numbers, performing product processing on third squared spectral coefficients of the plurality of spectral line sequence numbers to obtain a first product result; performing square root calculation on the first product result based on a quantity of spectral line sequence numbers to obtain the geometric mean corresponding to the third spectral line combination; and combining geometric means of a plurality of third spectral line combinations into the geometric mean of the third spectral line combination.

In some embodiments, the extraction module 4554 is further configured to: obtain third fusion configuration data of the high-frequency spectrum, the third fusion configuration data including a spectral line sequence number of each third spectral line combination; and perform the following processing on each third spectral line combination: extracting a spectral coefficient corresponding to each spectral line sequence number of the third spectral line combination from the high-frequency spectrum; squaring the spectral coefficient of each spectral line sequence number to obtain a third squared spectral coefficient of each spectral line sequence number; in a case that the third spectral line combination includes a plurality of spectral line sequence numbers, summing third squared spectral coefficients of the plurality of spectral line sequence numbers to obtain a third summation result; averaging the third summation result based on a quantity of spectral line sequence numbers to obtain the arithmetic mean corresponding to the third spectral line combination; and combining arithmetic means of a plurality of third spectral line combinations into the arithmetic mean of the third spectral line combination.

In some embodiments, the quantization module 4555 is further configured to: obtain a quantization table of the spectral flatness information and a quantization table of the spectral envelope information; quantize the spectral flatness information of the high-frequency spectrum based on the quantization table of the spectral flatness information to obtain a spectral flatness quantization result; quantize the spectral envelope information of the audio signal based on the quantization table of the spectral envelope information to obtain a spectral envelope quantization result; and combine the spectral flatness quantization result and the spectral envelope quantization result into the bandwidth extension bitstream of the audio signal.

In some embodiments, the quantization module 4555 is further configured to: obtain a plurality of speech sample signals, and performing the following processing on each speech sample signal; filter the speech sample signal to obtain a low-frequency sample signal and a high-frequency sample signal of the speech sample signal, a frequency of the low-frequency sample signal being lower than that of the high-frequency sample signal; perform frequency domain transform on the low-frequency sample signal to obtain a low-frequency sample spectrum, and perform frequency domain transform on the high-frequency sample signal to obtain a high-frequency sample spectrum; perform spectral envelope extraction on the low-frequency sample spectrum and the high-frequency sample spectrum to obtain spectral envelope information of the speech sample signal, and perform spectral flatness extraction on the high-frequency spectrum to obtain spectral flatness information of the speech sample signal; cluster spectral flatness information of the plurality of speech sample signals to obtain a plurality of spectral flatness clustering centers and spectral flatness corresponding to each spectral flatness clustering center, and construct the quantization table of the spectral flatness information based on the plurality of spectral flatness clustering centers and the spectral flatness information corresponding to each spectral flatness clustering center; and cluster spectral envelope information of the plurality of speech sample signals to obtain a plurality of spectral envelope clustering centers and spectral envelope information corresponding to each spectral envelope clustering center, and construct the quantization table of the spectral envelope information based on the plurality of spectral envelope clustering centers and the spectral envelope information corresponding to each spectral envelope clustering center.

In some embodiments, the encoding module 4552 is further configured to: filter an audio signal to obtain a low-frequency signal and a high-frequency signal of the audio signal, a frequency of the low-frequency signal being lower than that of the high-frequency signal; perform feature extraction on the low-frequency signal to obtain a first feature of the low-frequency signal; and perform high-frequency analysis on the high-frequency signal to obtain a second feature of the high-frequency signal, feature dimensionality of the second feature being lower than that of the first feature, and perform quantization encoding on the first feature and the second feature to obtain a bitstream of the low-frequency signal of the audio signal.

The following further describes an exemplary structure of the audio processing apparatus 555 provided in embodiments of the present disclosure when the apparatus is implemented as software modules. In some embodiments, as shown in FIG. 2B, software modules of the audio processing apparatus 555 stored in the memory 550 may include: a splitting module 5551, configured to split an encoded bitstream to obtain a bandwidth extension bitstream and a bitstream of a low-frequency signal; a decoding module 5552, configured to decode the bitstream of the low-frequency signal to obtain the low-frequency signal, and perform frequency domain transform on the low-frequency signal to obtain a low-frequency spectrum of the low-frequency signal; a dequantization module 5553, configured to dequantize the bandwidth extension bitstream to obtain spectral flatness information and spectral envelope information; a reconstruction module 5554, configured to perform high-frequency spectrum reconstruction based on the spectral flatness information, the spectral envelope information, and the low-frequency spectrum to obtain a high-frequency spectrum, a frequency of the high-frequency spectrum being higher than that of the low-frequency spectrum; and a time domain transform module 5555, configured to perform time domain transform on the high-frequency spectrum to obtain a high-frequency signal, and synthesize the low-frequency signal and the high-frequency signal to obtain an audio signal corresponding to the encoded bitstream.

In some embodiments, the reconfiguration module 5554 is further configured to: perform spectral flatness extraction on the low-frequency spectrum to obtain low-frequency spectral flatness information of the low-frequency spectrum; extract subband spectral flatness information of each high-frequency subband corresponding to the high-frequency spectrum from the spectral flatness information, and extract subband spectral envelope information of each high-frequency subband corresponding to the high-frequency spectrum from the spectral envelope information; for each high-frequency subband of the high-frequency spectrum, determining a spectral flatness difference between subband spectral flatness information of each low-frequency subband in the low-frequency spectrum and subband spectral flatness information of the high-frequency subband, and determining a low-frequency subband with the smallest spectral flatness difference as a target spectrum; and perform amplitude adjustment on the target spectrum corresponding to each high-frequency subband based on the subband spectral envelope information of each high-frequency subband corresponding to the high-frequency spectrum and the spectral flatness difference corresponding to each high-frequency subband, and splice adjustment results corresponding to a plurality of high-frequency subbands into the high-frequency spectrum.

In some embodiments, the reconfiguration module 5554 is further configured to: perform the following processing on the target spectrum corresponding to each high-frequency subband: determining white noise matching the spectral flatness difference of the high-frequency subband, and adding the matching white noise to the target spectrum to obtain a composite target spectrum; determining spectral envelope information of the composite target spectrum, and determining a spectral envelope difference between the spectral envelope information of the composite target spectrum and the spectral envelope information of the high-frequency subband; and adjusting an amplitude of the composite target spectrum based on the spectral envelope difference.

In some embodiments, the reconfiguration module 5554 is further configured to: obtain a geometric mean of the low-frequency spectrum, and obtain an arithmetic mean of the low-frequency spectrum; and use a ratio of the geometric mean of the low-frequency spectrum to the arithmetic mean of the low-frequency spectrum as spectral flatness information of the low-frequency spectrum.

In some embodiments, the reconfiguration module 5554 is further configured to: obtain fourth fusion configuration data of the low-frequency spectrum, the fourth fusion configuration data including a spectral line sequence number of each fourth spectral line combination; and perform the following processing on each fourth spectral line combination: extracting a spectral coefficient corresponding to each spectral line sequence number of the fourth spectral line combination from the low-frequency spectrum; squaring the spectral coefficient of each spectral line sequence number to obtain a fourth squared spectral coefficient of each spectral line sequence number; in a case that the fourth spectral line combination includes a plurality of spectral line sequence numbers, performing product processing on fourth squared spectral coefficients of the plurality of spectral line sequence numbers to obtain a second product result; performing square root calculation on the second product result based on a quantity of spectral line sequence numbers to obtain the geometric mean corresponding to the fourth spectral line combination; and combining geometric means of a plurality of fourth spectral line combinations into the geometric mean of the low-frequency spectrum.

In some embodiments, the reconfiguration module 5554 is further configured to: obtain fourth fusion configuration data of the low-frequency spectrum, the fourth fusion configuration data including a spectral line sequence number of each fourth spectral line combination; and perform the following processing on each fourth spectral line combination: extracting a spectral coefficient corresponding to each spectral line sequence number of the fourth spectral line combination from the low-frequency spectrum; squaring the spectral coefficient of each spectral line sequence number to obtain a fourth squared spectral coefficient of each spectral line sequence number; in a case that the fourth spectral line combination includes a plurality of spectral line sequence numbers, summing fourth squared spectral coefficients of the plurality of spectral line sequence numbers to obtain a fourth summation result; averaging the fourth summation result based on a quantity of spectral line sequence numbers to obtain the arithmetic mean corresponding to the fourth spectral line combination; and combining arithmetic means of a plurality of fourth spectral line combinations into the arithmetic mean of the low-frequency spectrum.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Embodiments of the present disclosure provide a computer program product. The computer program product includes computer-executable instructions. The computer-executable instructions are stored in a computer-readable storage medium. A processor of an electronic device reads the computer-executable instructions from the computer-readable storage medium, and the processor executes the computer-executable instructions, so that the electronic device performs the audio processing method in embodiments of the present disclosure.

Embodiments of the present disclosure provide a computer-readable storage medium, having computer-executable instructions stored therein. When the computer-executable instructions are executed by a processor, the processor is enabled to perform the audio processing method provided in embodiments of the present disclosure, for example, the audio processing method shown in FIG. 3A to FIG. 3D.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the computer-executable instructions may be written in the form of a program, software, a software module, a script, or code according to a programming language in any form (including a compiled or interpretive language, or a declarative or procedural language), and may be deployed in any form, including being deployed as a standalone program, or being deployed as a module, a component, a subroutine, or another unit suitable for use in a computing environment.

In an example, the computer-executable instructions may be, but are not necessarily, stored in a file corresponding to a file system, and may be stored in a file of other programs or data, for example, stored in one or more scripts of a Hypertext Markup Language (HTML) document, stored in a single file dedicated for the discussed program, or stored in a plurality of co-files (for example, files that store one or more modules, subroutines, or code parts).

In an example, the computer-executable instructions may be deployed on one electronic device for execution, or may be executed on a plurality of electronic devices at one location, or may be executed on a plurality of electronic devices that are distributed at a plurality of locations and that are interconnected through a communication network.

To sum up, in embodiments of the present disclosure, an audio signal is filtered to obtain a low-frequency signal with a low frequency and a high-frequency signal with a high frequency, and the low-frequency signal is encoded to obtain a bitstream of the low-frequency signal. Spectral envelope information of the audio signal and spectral flatness information of the high-frequency signal are extracted from a low-frequency spectrum of the low-frequency signal and a high-frequency spectrum of the high-frequency signal. Quantization encoding is performed on the spectral flatness information and the spectral envelope information to obtain a bandwidth extension bitstream of the audio signal, and the bandwidth extension bitstream of the audio signal is combined with the bitstream of the low-frequency signal into an encoded bitstream of the audio signal. The high-frequency signal can be effectively encoded based on the spectral envelope information and the spectral flatness information, to improve code integrity of the high-frequency part and improve quality of audio obtained through subsequent decoding.

The foregoing descriptions are merely embodiments of the present disclosure and are not intended to limit the protection scope of the present disclosure. Any modification, equivalent replacement, or improvement made without departing from the spirit and scope of the present disclosure shall fall within the protection scope of the present disclosure.

What is claimed is:

1. An audio processing method, the method being performed by an electronic device, and the method comprising:
- filtering an audio signal to obtain a low-frequency signal and a high-frequency signal;
- performing first encoding on the low-frequency signal to obtain a bitstream of the low-frequency signal;
- performing frequency domain transform on the low-frequency signal and the high-frequency signal respectively, to obtain a low-frequency spectrum and a high-frequency spectrum;
- performing spectral envelope extraction on the low-frequency spectrum and the high-frequency spectrum to obtain spectral envelope information of the audio signal;
- extracting, from the high-frequency spectrum, spectral flatness information of the high-frequency spectrum based on a target spectral line combination corresponding to the high-frequency spectrum;
- performing quantization encoding on the spectral flatness information of the high-frequency spectrum and the spectral envelope information of the audio signal to obtain a bandwidth extension bitstream of the audio signal; and
- combining the bandwidth extension bitstream and the bitstream of the low-frequency signal into an encoded bitstream of the audio signal.

2. The method according to claim 1, wherein the performing spectral envelope extraction on the low-frequency spectrum and the high-frequency spectrum to obtain spectral envelope information of the audio signal comprises:
- performing spectral envelope extraction on the low-frequency spectrum to obtain low-frequency spectral envelope information of the low-frequency spectrum;
- performing spectral envelope extraction on the high-frequency spectrum to obtain high-frequency spectral envelope information of the high-frequency spectrum; and
- combining the low-frequency spectral envelope information and the high-frequency spectral envelope information into the spectral envelope information of the audio signal.

3. The method according to claim 2, wherein the performing spectral envelope extraction on the low-frequency spectrum to obtain spectral envelope information of the low-frequency spectrum comprises:
- obtaining first fusion configuration data of the low-frequency spectrum, the first fusion configuration data comprising a spectral line sequence number of each first spectral line combination; and
- performing the following processing on each first spectral line combination of at least one first spectral line combination:
  - extracting a spectral coefficient corresponding to each spectral line sequence number of the first spectral line combination from the low-frequency spectrum;
  - squaring the spectral coefficient of each spectral line sequence number to obtain a first squared spectral coefficient of each spectral line sequence number;
  - in a case that the first spectral line combination comprises a plurality of spectral line sequence numbers, summing first squared spectral coefficients of the plurality of spectral line sequence numbers to obtain a first summation result; and
  - performing logarithmic processing on the first summation result to obtain first fusion spectral envelope information corresponding to the first spectral line combination; and
- generating the low-frequency spectral envelope information based on the first fusion spectral envelope information of the at least one first spectral line combination.

4. The method according to claim 2, wherein the performing spectral envelope extraction on the high-frequency spectrum to obtain high-frequency spectral envelope information of the high-frequency spectrum comprises:
- obtaining second fusion configuration data of the high-frequency spectrum, the second fusion configuration data comprising a spectral line sequence number of each second spectral line combination; and
- performing the following processing on each second spectral line combination of at least one second spectral line combination:
  - extracting a spectral coefficient corresponding to each spectral line sequence number of the second spectral line combination from the high-frequency spectrum;
  - squaring the spectral coefficient of each spectral line sequence number to obtain a second squared spectral coefficient of each spectral line sequence number;
  - in a case that the second spectral line combination comprises a plurality of spectral line sequence numbers, summing second squared spectral coefficients of the plurality of spectral line sequence numbers to obtain a second summation result; and
  - performing logarithmic processing on the second summation result to obtain second fusion spectral envelope information corresponding to the second spectral line combination; and
- generating the high-frequency spectral envelope information based on the second fusion spectral envelope information of the at least one second spectral line combination.

5. The method according to claim 1, wherein the target spectral line combination comprises a third spectral line combination, and the extracting, from the high-frequency spectrum, the spectral flatness information of the high-frequency spectrum comprises:
- obtaining third fusion configuration data of the high-frequency spectrum, the third fusion configuration data comprising a spectral line sequence number of each third spectral line combination; and
- performing the following processing on each third spectral line combination of at least one third spectral line combination:
  - obtaining a geometric mean of the third spectral line combination, and obtaining an arithmetic mean of the third spectral line combination; and
  - using a ratio of the geometric mean of the third spectral line combination to the arithmetic mean of the third spectral line combination as spectral flatness information of the third spectral line combination; and generating the spectral flatness information of the high-frequency spectrum based on the spectral flatness information of the at least one third spectral line combination.

6. The method according to claim 5, wherein the obtaining a geometric mean of the third spectral line combination comprises:

extracting a spectral coefficient corresponding to each spectral line sequence number of the third spectral line combination from the high-frequency spectrum;

squaring the spectral coefficient of each spectral line sequence number to obtain a third squared spectral coefficient of each spectral line sequence number;

in a case that the third spectral line combination comprises a plurality of spectral line sequence numbers, performing product processing on third squared spectral coefficients of the plurality of spectral line sequence numbers to obtain a first product result; and performing square root calculation on the first product result based on a quantity of spectral line sequence numbers to obtain the geometric mean corresponding to the third spectral line combination.

7. The method according to claim 5, wherein the obtaining an arithmetic mean of the third spectral line combination comprises:

extracting a spectral coefficient corresponding to each spectral line sequence number of the third spectral line combination from the high-frequency spectrum;

squaring the spectral coefficient of each spectral line sequence number to obtain a third squared spectral coefficient of each spectral line sequence number;

in a case that the third spectral line combination comprises a plurality of spectral line sequence numbers, summing third squared spectral coefficients of the plurality of spectral line sequence numbers to obtain a third summation result; and averaging the third summation result based on a quantity of spectral line sequence numbers to obtain the arithmetic mean corresponding to the third spectral line combination.

8. The method according to claim 1, wherein the performing quantization encoding on the spectral flatness information of the high-frequency spectrum and the spectral envelope information of the audio signal to obtain a bandwidth extension bitstream of the audio signal comprises:

obtaining a quantization table of the spectral flatness information and a quantization table of the spectral envelope information;

quantizing the spectral flatness information of the high-frequency spectrum based on the quantization table of the spectral flatness information to obtain a spectral flatness quantization result;

quantizing the spectral envelope information of the audio signal based on the quantization table of the spectral envelope information to obtain a spectral envelope quantization result; and combining the spectral flatness quantization result and the spectral envelope quantization result into the bandwidth extension bitstream of the audio signal.

9. The method according to claim 8, wherein the obtaining a quantization table of the spectral flatness information and a quantization table of the spectral envelope information comprises:

obtaining a plurality of speech sample signals, and performing the following processing on each speech sample signal;

filtering the speech sample signal to obtain a low-frequency sample signal and a high-frequency sample signal of the speech sample signal, a frequency of the low-frequency sample signal being lower than that of the high-frequency sample signal;

performing frequency domain transform on the low-frequency sample signal to obtain a low-frequency sample spectrum, and performing frequency domain transform on the high-frequency sample signal to obtain a high-frequency sample spectrum; and performing spectral envelope extraction on the low-frequency sample spectrum and the high-frequency sample spectrum to obtain spectral envelope information of the speech sample signal, and performing spectral flatness extraction on the high-frequency spectrum to obtain spectral flatness information of the speech sample signal;

clustering spectral flatness information of the plurality of speech sample signals to obtain a plurality of spectral flatness clustering centers, and constructing the quantization table of the spectral flatness information based on the plurality of spectral flatness clustering centers; and clustering spectral envelope information of the plurality of speech sample signals to obtain a plurality of spectral envelope clustering centers, and constructing the quantization table of the spectral envelope information based on the plurality of spectral envelope clustering centers.

10. The method according to claim 1, wherein the quantization encoding is performed based on a quantization table of the spectral flatness information and a quantization table of the spectral envelope information.

11. An audio processing method, the method being performed by an electronic device, and the method comprising:

splitting an encoded bitstream to obtain a bandwidth extension bitstream and a bitstream of a low-frequency signal;

decoding the bitstream of the low-frequency signal to obtain the low-frequency signal, and performing frequency domain transform on the low-frequency signal to obtain a low-frequency spectrum of the low-frequency signal;

dequantizing the bandwidth extension bitstream to obtain spectral flatness information and spectral envelope information;

performing high-frequency spectrum reconstruction based on the spectral flatness information, the spectral envelope information, and the low-frequency spectrum to obtain a high-frequency spectrum, comprising:

obtaining subband spectral flatness information of each low-frequency subband of the low-frequency spectrum;

for each high-frequency subband of the high-frequency spectrum, determining, a low-frequency subband having a smallest spectral flatness difference with the high-frequency subband, as a target spectrum;

performing amplitude adjustment on the target spectrum corresponding to each high-frequency subband based on subband spectral envelope information of each high-frequency subband corresponding to the high-frequency spectrum and the spectral flatness difference corresponding to each high-frequency subband, to obtain adjustment results of a plurality of high-frequency subbands; and splicing the adjustment results into the high-frequency spectrum; and performing time domain transform on the high-frequency spectrum to obtain a high-frequency signal, and synthesizing the low-frequency signal and the high-frequency signal to obtain an audio signal corresponding to the encoded bitstream.

12. The method according to claim 11, wherein the performing high-frequency spectrum reconstruction based on the spectral flatness information, the spectral envelope information, and the low-frequency spectrum to obtain a high-frequency spectrum further comprises: before determining the target spectrum, performing spectral flatness extraction on the low-frequency spectrum to obtain low-frequency spectral flatness information of the low-frequency spectrum;

extracting the subband spectral flatness information of each low-frequency subband from the low-frequency spectral flatness information;

extracting subband spectral flatness information of each high-frequency subband corresponding to the high-frequency spectrum from the spectral flatness information; and extracting the subband spectral envelope information of each high-frequency subband corresponding to the high-frequency spectrum from the spectral envelope information.

13. The method according to claim 11, wherein the performing amplitude adjustment on the target spectrum corresponding to each high-frequency subband based on the subband spectral envelope information of each high-frequency subband corresponding to the high-frequency spectrum and the spectral flatness difference corresponding to each high-frequency subband comprises:

determining white noise matching the spectral flatness difference of the high-frequency subband;

adding the matching white noise to the target spectrum to obtain a composite target spectrum;

determining spectral envelope information of the composite target spectrum;

determining a spectral envelope difference between the spectral envelope information of the composite target spectrum and the spectral envelope information of the high-frequency subband; and performing the amplitude adjustment on an amplitude of the composite target spectrum based on the spectral envelope difference.

14. A non-transitory computer-readable storage medium, having executable instructions stored therein, when the computer-executable instructions are executed by at least one processor, causing the at least one processor to perform:

filtering an audio signal to obtain a low-frequency signal and a high-frequency signal;

performing first encoding on the low-frequency signal to obtain a bitstream of the low-frequency signal;

performing frequency domain transform on the low-frequency signal the high-frequency signal respectively, to obtain a low-frequency spectrum and a high-frequency spectrum;

performing spectral envelope extraction on the low-frequency spectrum and the high-frequency spectrum to obtain spectral envelope information of the audio signal;

extracting, from the high-frequency spectrum, spectral flatness information of the high-frequency spectrum based on a target spectral line combination corresponding to the high-frequency spectrum;

performing quantization encoding on the spectral flatness information of the high-frequency spectrum and the spectral envelope information of the audio signal to obtain a bandwidth extension bitstream of the audio signal; and combining the bandwidth extension bitstream and the bitstream of the low-frequency signal into an encoded bitstream of the audio signal.

15. The storage medium according to claim 14, wherein the performing spectral envelope extraction on the low-frequency spectrum and the high-frequency spectrum to obtain spectral envelope information of the audio signal comprises:

performing spectral envelope extraction on the low-frequency spectrum to obtain low-frequency spectral envelope information of the low-frequency spectrum;

performing spectral envelope extraction on the high-frequency spectrum to obtain high-frequency spectral envelope information of the high-frequency spectrum; and combining the low-frequency spectral envelope information and the high-frequency spectral envelope information into the spectral envelope information of the audio signal.

16. The storage medium according to claim 15, wherein the performing spectral envelope extraction on the low-frequency spectrum to obtain spectral envelope information of the low-frequency spectrum comprises:

obtaining first fusion configuration data of the low-frequency spectrum, the first fusion configuration data comprising a spectral line sequence number of each first spectral line combination; and performing the following processing on each first spectral line combination of at least one first spectral line combination:

extracting a spectral coefficient corresponding to each spectral line sequence number of the first spectral line combination from the low-frequency spectrum;

squaring the spectral coefficient of each spectral line sequence number to obtain a first squared spectral coefficient of each spectral line sequence number;

in a case that the first spectral line combination comprises a plurality of spectral line sequence numbers, summing first squared spectral coefficients of the plurality of spectral line sequence numbers to obtain a first summation result; and performing logarithmic processing on the first summation result to obtain first fusion spectral envelope information corresponding to the first spectral line combination; and generating the low-frequency spectral envelope information based on the first fusion spectral envelope information of the at least one first spectral line combination.

17. The storage medium according to claim 15, wherein the performing spectral envelope extraction on the high-frequency spectrum to obtain high-frequency spectral envelope information of the high-frequency spectrum comprises:

obtaining second fusion configuration data of the high-frequency spectrum, the second fusion configuration data comprising a spectral line sequence number of each second spectral line combination; and performing the following processing on each second spectral line combination of at least one second spectral line combination:

extracting a spectral coefficient corresponding to each spectral line sequence number of the second spectral line combination from the high-frequency spectrum;

squaring the spectral coefficient of each spectral line sequence number to obtain a second squared spectral coefficient of each spectral line sequence number;

in a case that the second spectral line combination comprises a plurality of spectral line sequence numbers, summing second squared spectral coefficients of the plurality of spectral line sequence numbers to obtain a second summation result; and performing logarithmic processing on the second summation result to obtain second fusion spectral envelope information corresponding to the second spectral line combination; and generating the high-frequency spectral envelope information based on the second fusion spectral envelope information of the at least one second spectral line combination.

18. An electronic device, comprising:

at least one memory, configured to store computer-executable instructions; and at least one processor, configured, when executing the computer-executable instructions stored in the at least one memory, to implement the audio processing method according to claim 1.

19. An electronic device, comprising:

at least one memory, configured to store computer-executable instructions; and at least one processor, configured, when executing the computer-executable instructions stored in the at least one memory, to implement the audio processing method according to claim 11.

20. A non-transitory computer-readable storage medium, having executable instructions stored therein, when the computer-executable instructions are executed by at least one processor, causing the at least one processor to perform the audio processing method according to claim 11.

* * * * *